United States Patent [19]
Kobayashi et al.

[11] Patent Number: 5,978,333
[45] Date of Patent: *Nov. 2, 1999

[54] RECORDING/REPRODUCING APPARATUS AND METHOD

[75] Inventors: Shoei Kobayashi, Kanagawa; Toru Takeda, Saitama; Tamotsu Yamagami, Tokyo, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/807,767

[22] Filed: Feb. 27, 1997

[30] Foreign Application Priority Data

Mar. 1, 1996 [JP] Japan ................................. 8-044408

[51] Int. Cl.$^6$ ..................................................... G11B 7/00
[52] U.S. Cl. ................................... 369/44.41; 369/44.13; 369/44.35
[58] Field of Search ............................. 369/275.3, 44.41, 369/44.13, 124, 44.32, 59, 54, 58, 48

[56] References Cited

U.S. PATENT DOCUMENTS

| | | | |
|---|---|---|---|
| 4,914,645 | 4/1990 | Getreuer et al. | 369/44.37 |
| 4,972,401 | 11/1990 | Carasso et al. | 369/59 |
| 5,210,738 | 5/1993 | Iwata et al. | 369/275.1 |
| 5,216,656 | 6/1993 | Sako et al. | 369/59 |
| 5,339,302 | 8/1994 | Takahashi et al. | 369/54 |
| 5,363,360 | 11/1994 | Fairchild | 369/50 |
| 5,436,770 | 7/1995 | Muto et al. | 360/51 |
| 5,469,416 | 11/1995 | Yamagami et al. | 369/50 |
| 5,488,590 | 1/1996 | Watanabe et al. | 369/13 |
| 5,497,367 | 3/1996 | Yamagami et al. | 369/275.2 |
| 5,559,774 | 9/1996 | Watanabe et al. | 369/47 |
| 5,602,690 | 2/1997 | Tomisaki et al. | 360/75 |
| 5,617,388 | 4/1997 | Ishioka et al. | 369/44.28 |
| 5,682,365 | 10/1997 | Carasso et al. | 369/44.13 |
| 5,835,478 | 11/1998 | Kobayashi et al. | 369/275.3 |

FOREIGN PATENT DOCUMENTS

0487321 A2  5/1992  European Pat. Off. .

*Primary Examiner*—Nabil Hindi
*Attorney, Agent, or Firm*—Limbach & Limbach L.L.P.

[57] ABSTRACT

An information recording/reproducing apparatus wherein exact reproduction of both wobbled address information and sync information can be realized in a recording mode as well as in a reproduction mode. The apparatus comprises first and second detectors for detecting two diametrical side portions of each track on a recording medium where a pregroove is modulated correspondingly to address information and sync information of mutually different frequency bands; a calculator for calculating a normalized track information signal on the basis of the outputs of the first and second detectors; and a third detector for detecting the address information and/or the sync signal on the basis of the output of the calculator.

12 Claims, 21 Drawing Sheets

FIG. 1
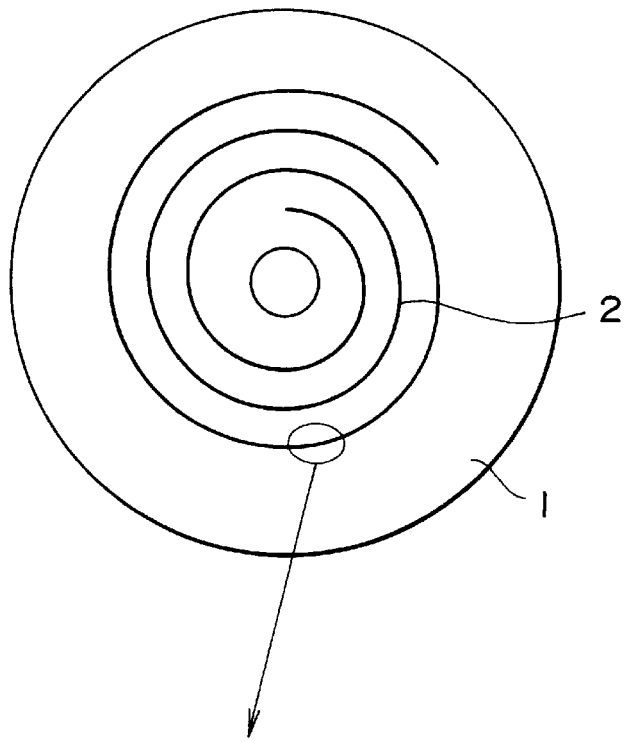
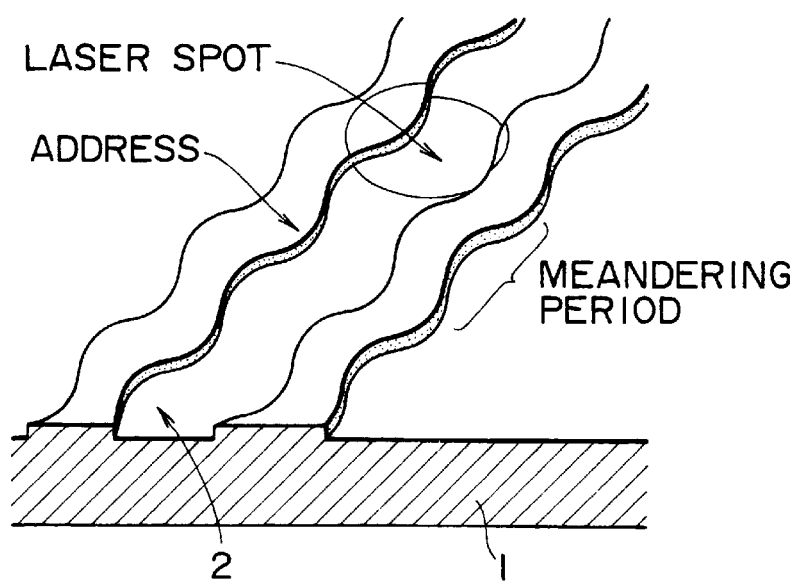

WOBBLED DATA FRAME STRUCTURE

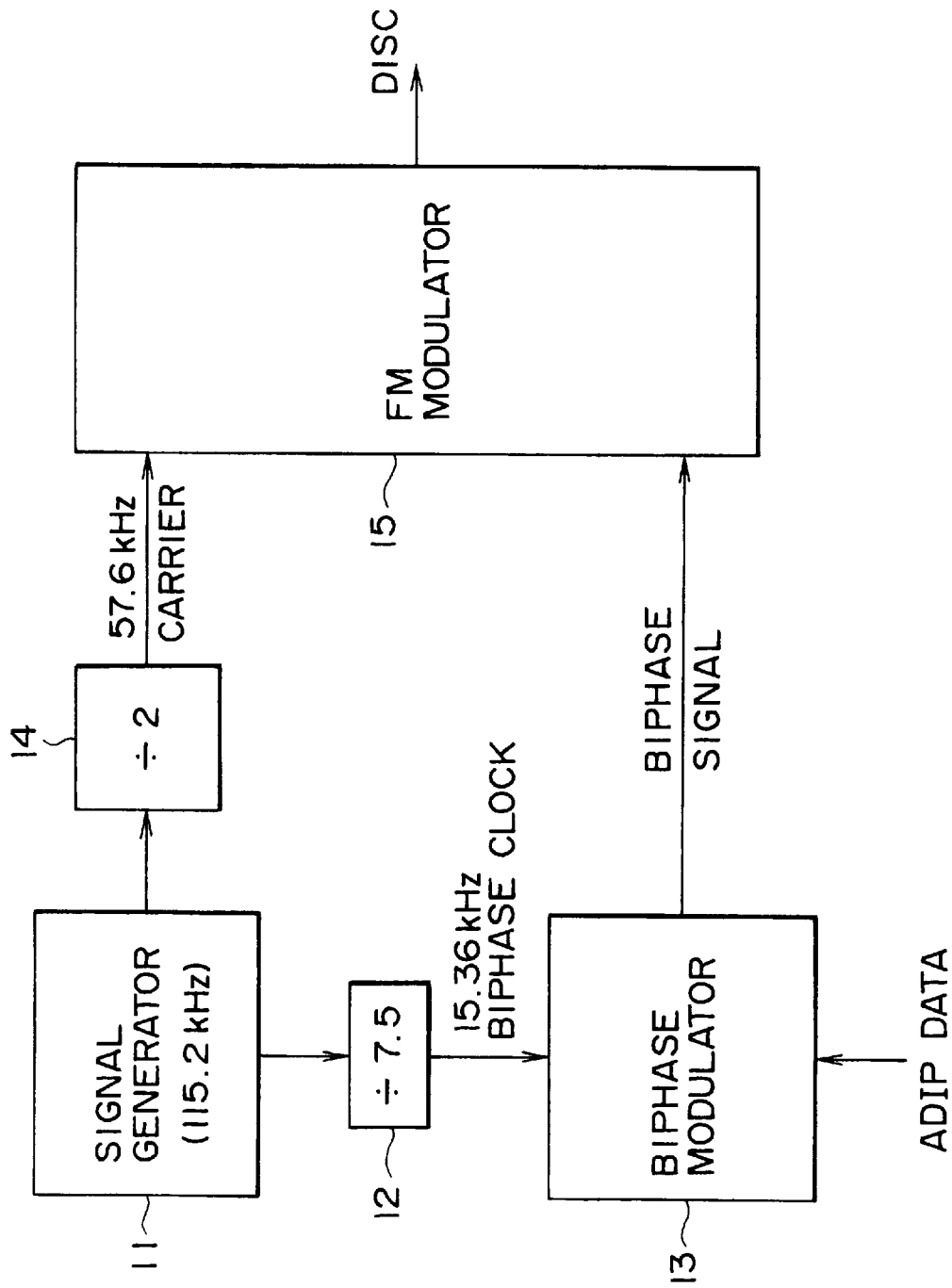

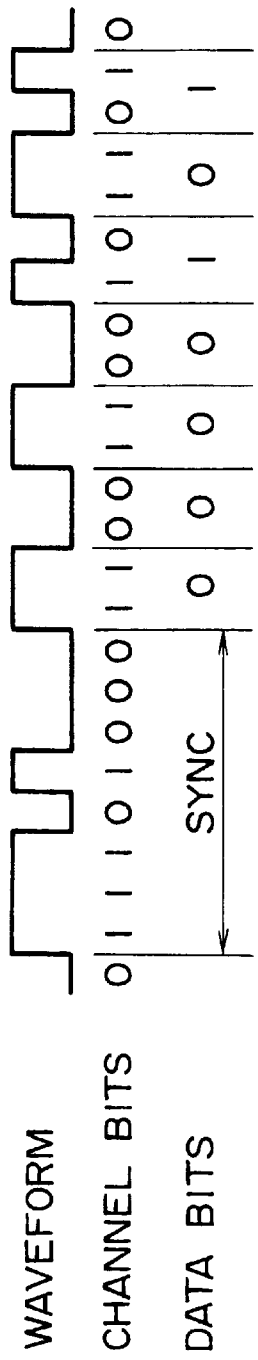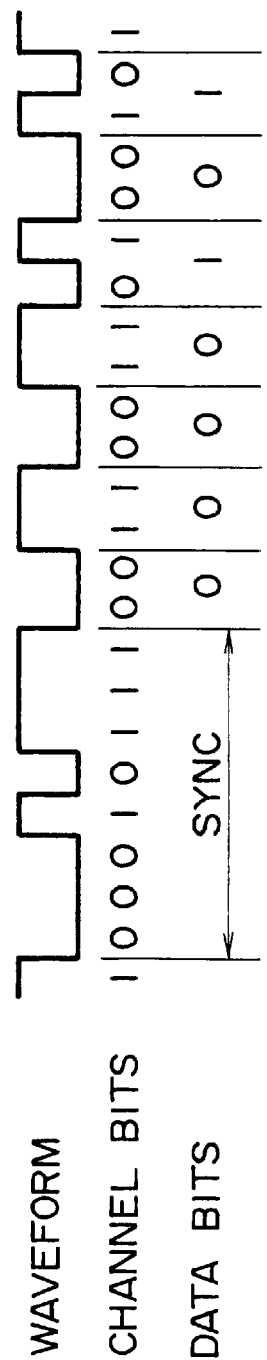

F I G. 15
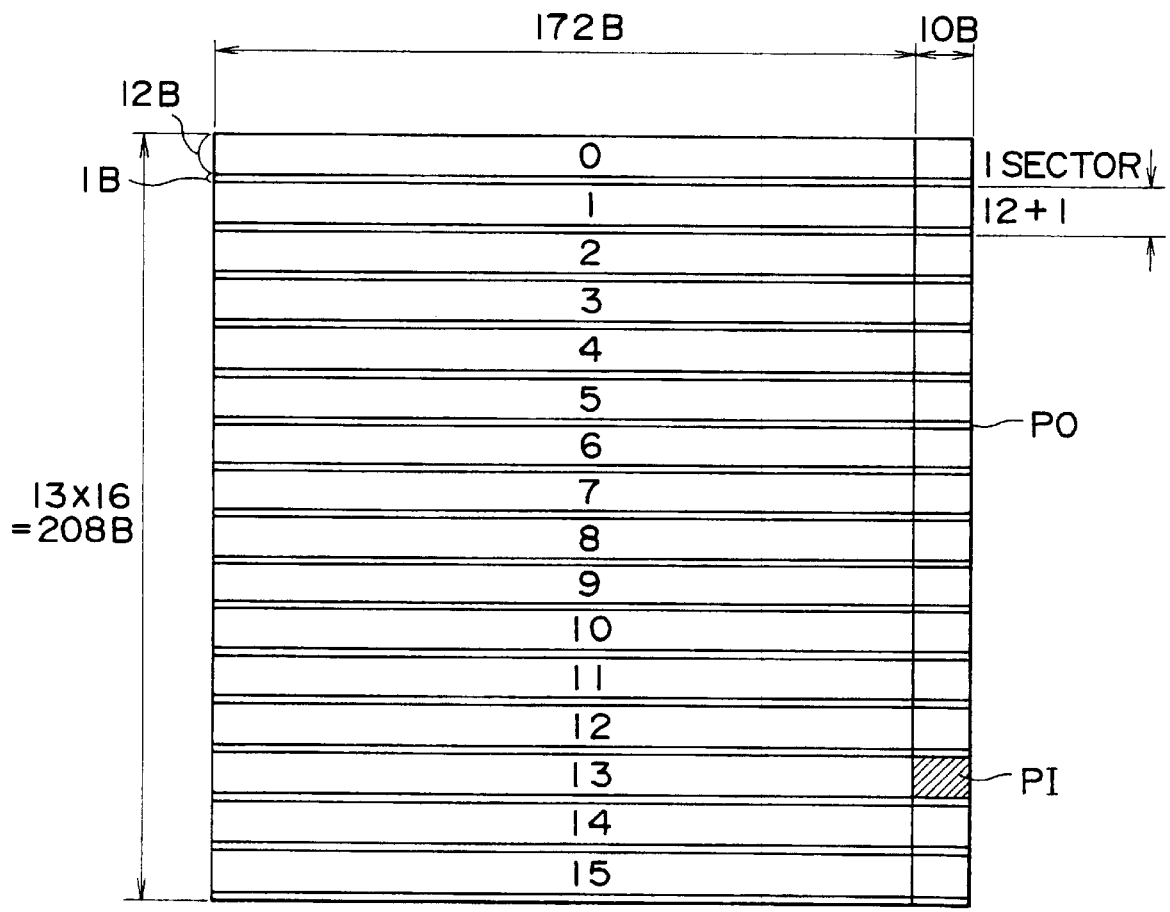

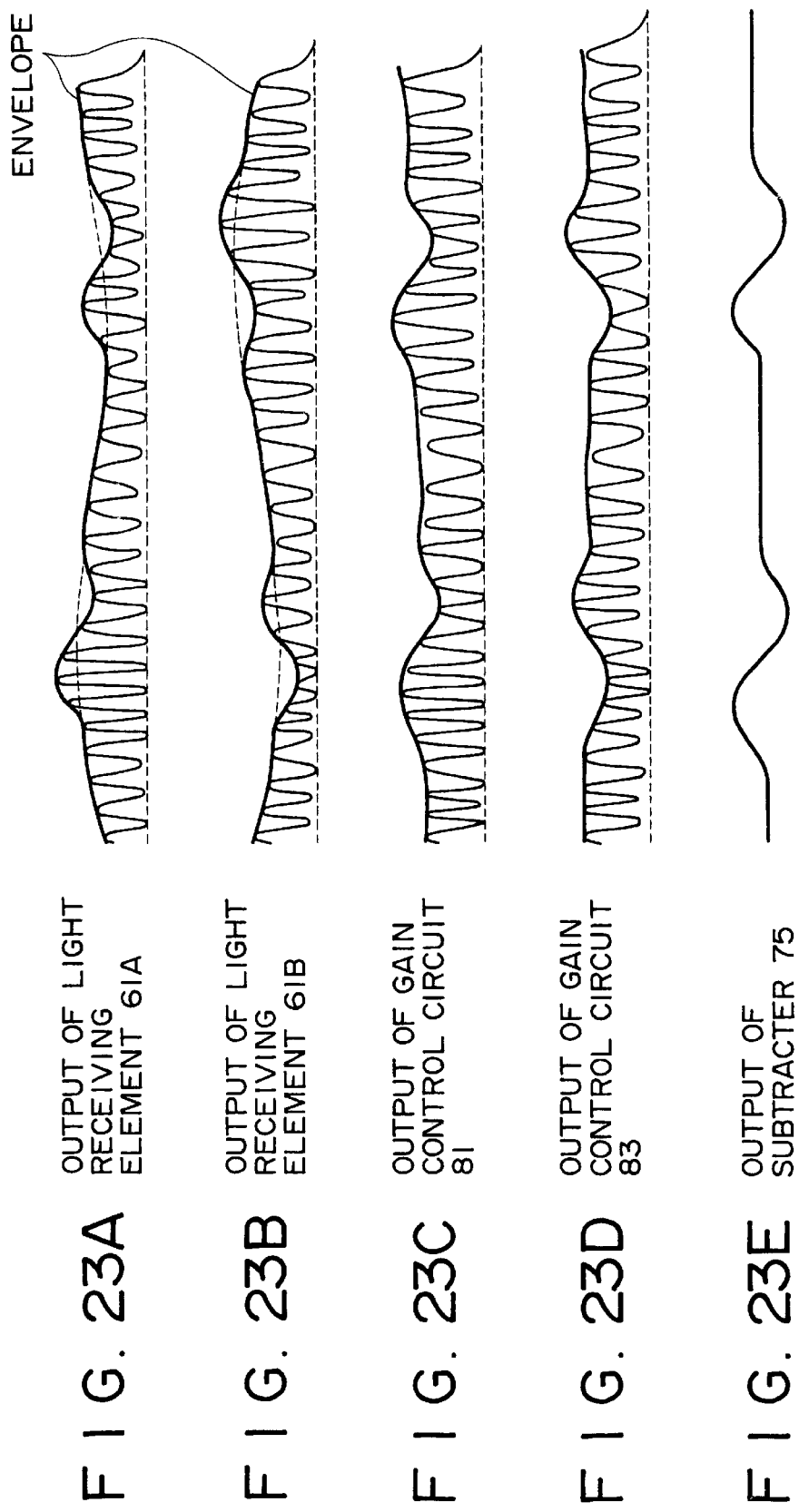

– 1 –

RECORDING/REPRODUCING APPARATUS AND METHOD

BACKGROUND OF THE INVENTION

The present invention relates to an apparatus and a method for recording and/or reproducing data, and more particularly to those capable of performing exact detection of address information or sync information.

For recording data at predetermined positions on tracks of a disk and reading the recorded data from a desired position out of the entire data, it is necessary to record, on the entire tracks, address information which indicates the position each track. In some of optical disks, such address information is recorded by wobbling a track, which is previously formed as a pregroove, correspondingly to the address information. When an access is made to a desired position, the address information recorded by such wobbling is reproduced to thereby specify the position.

Also in some optical disks, a technique of previously forming a predetermined number of sync marks on a pregroove may be contrived to generate a clock signal required for recording and/or reproducing the data. Since such sync marks are formed in a fixed period, clock pulses required for recording and/or reproducing the data can be generated in synchronism with reproduced sync marks.

In this manner, address information or sync information formed previously in a pregroove can be read out by irradiating a laser beam onto a disk and detecting a change of the reflectivity. Accordingly, in a reproduction mode, a laser beam of a fixed intensity is irradiated onto a disk and the data are reproduced from the reflected beam, so that the address information or the sync information can be detected with relative facility as a change of the level.

However, when pits or marks (hereinafter referred to simply as marks) are formed on a track in a recording mode, the intensity of the laser beam is increased and, at any position where no mark is formed, the laser beam intensity is reduced to the same as that in the reproduction mode. As a result, the intensity of the reflection from the disk in the recording mode is changed in accordance with the recorded data (mark-formed position). Therefore, it becomes difficult, particularly in the recording mode, to achieve exact reproduction of the address information or the sync information.

OBJECT AND SUMMARY OF THE INVENTION

The present invention has been accomplished in view of the circumstances mentioned above. It is an object of the invention to realize exact reproduction of both address information and sync information in a recording mode as well as in a reproduction mode.

According to one aspect of the present invention, there is provided a recording/reproducing apparatus which comprises first and second detector means for detecting two diametrical side portions of each track on a recording medium where a pregroove is modulated correspondingly to address information and sync information of mutually different frequency bands; a calculator means for calculating a normalized track information signal on the basis of the outputs of the first and second detector means; and a third detector means for detecting the address information and/or the sync signal on the basis of the output of the calculator means.

According to another aspect of the present invention, there is provided a recording/reproducing method which comprises the steps of: detecting two diametrical side portions of each track on a recording medium where a pregroove is modulated correspondingly to address information and sync information of mutually different frequency bands; calculating a normalized track information signal on the basis of the detected outputs; and detecting the address information and/or the sync signal on the basis of the calculated signal.

In the recording/reproducing apparatus and method mentioned, the difference between the detected left and right side components is normalized in accordance with the value thereof.

The above and other features and advantages of the present invention will become apparent from the following description which will be given with reference to the illustrative accompanying drawings.

BRIEF DESCRIPTION OF THE DRAWINGS

FIG. 1 is a schematic diagram for explaining how a pregroove is wobbled on a disk;

FIG. 3 shows an exemplary structure of a wobbling signal generator;

FIG. 4 shows an example of a biphase signal outputted from a biphase modulator 13 in FIG. 3;

FIG. 5 shows another example of a biphase signal outputted from the biphase modulator 13 in FIG. 3;

FIG. 15 is a schematic diagram for explaining how external codes in FIG. 14 are interleaved;

FIGS. 23A to 23E are timing charts of signals for explaining the operation of the embodiment shown in FIG. 22.

DESCRIPTION OF THE PREFERRED EMBODIMENTS

FIG. 1 shows a structural example of an optical disk where data are recorded and/or reproduced in a recording/reproducing apparatus of the present invention. As illustrated, a pregroove 2 is previously formed on a disk (optical disk) 1 spirally from the innermost circumference toward the outermost one. It is a matter of course that the pregroove 2 may be formed concentrically as well.

As partially enlarged in the illustration of FIG. 1, left and right side walls of the pregroove 2 are wobbled correspondingly to address information and are meandering in accordance with frequency-modulated waves. One track has a plurality of wobbling address frames.

Figure 2:
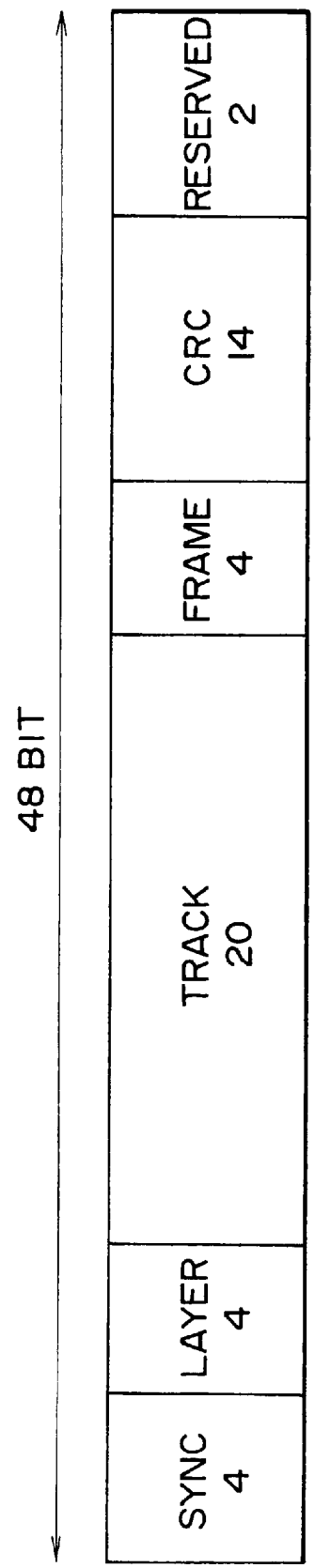
FIG. 2 shows an exemplary structure of a wobbling address frame.

FIG. 2 shows a structure (format) of a wobbling address frame. As shown, the wobbling address frame is composed of 48 bits. First 4 bits are used as a sync signal (Sync) to indicate a start of the wobbling address frame, and next 4 bits are used as a layer (Layer) representing one of a plurality of recording layers. Succeeding 20 bits are used to denote a track address (track number), and next 4 bits denote an address frame number. Subsequent 14 bits are used as an error correcting code (CRC) which is recorded for data with the exception of the sync signal (Sync). And the last 2 bits (Reserved) are held in reserve for the future.

For example, 8 wobbling address frames are recorded per track (per rotation) in such a manner as to form a CAV disk where the angular velocity of rotation of the disk is constant. Therefore, numerical values of 0 to 7 for example are recorded to represent the frame numbers in FIG. 2.

FIG. 3 shows an exemplary structure of a wobbling signal generator for generating a wobbling signal to wobble the pregroove 2 correspondingly to the address frame of the format shown in FIG. 2. The generator 11 generates a signal having a frequency of 115.2 kHz. The signal outputted from the generator 11 is supplied to a divider 12 to be divided by 7.5 therein, and a biphase clock signal having a frequency of 15.36 kHz is outputted therefrom. The clock signal thus obtained is supplied to a biphase modulator 13, to which ADIP (Address In Pregroove) data of the frame format shown in FIG. 2 are also supplied.

The biphase modulator 13 performs biphase modulation of the biphase clock signal, which is supplied from the divider 12, with the ADIP data (address data) supplied from an unshown circuit, and then outputs the biphase signal to an FM modulator 15. The FM modulator 15 also receives a carrier of frequency 57.6 kHz obtained through division, by a numerical value 2 in the divider 14, of the signal of 115.2 kHz outputted from the generator 11. Subsequently the FM modulator 15 performs frequency modulation of the input carrier from the divider 14 with the biphase signal inputted from the biphase modulator 13, and then outputs a frequency-modulated signal obtained as a result. The left and right side walls of the pregroove 2 on the disk 1 are wobbled correspondingly to this frequency-modulated signal.

FIGS. 4 and 5 show an example of the biphase signal outputted from the biphase modulator 13. In this embodiment, when the preceding bit is 0 as shown in FIG. 4, "11101000" is used as a sync pattern (SYNC), but when the preceding bit is 1 as shown in FIG. 5, "00010111" opposite in phase to the case of FIG. 4 is used as a sync pattern. The sync pattern SYNC is a non-regular unique one which does not appear in the modulation.

Out of data bits (Data bits) in the address data (ADIP data), "0" is biphase-modulated to be thereby converted into channel bits "11" (when the preceding channel bit is 0) or "00" (when the preceding channel bit is 1). Meanwhile, "1" is converted into channel bits "10" (when the preceding channel bit is 0) or "01" (when the preceding channel bit is 1). Conversion into which of such two patterns is dependent on the preceding code. More specifically, "Waveform" shown in FIGS. 4 and 5 represents a pattern of channel bits 1 and 0, wherein 1 signifies a high-level signal while 0 signifies a low-level signal, and either of the two patterns is so selected that the above waveform becomes continuous.

Figure 6:
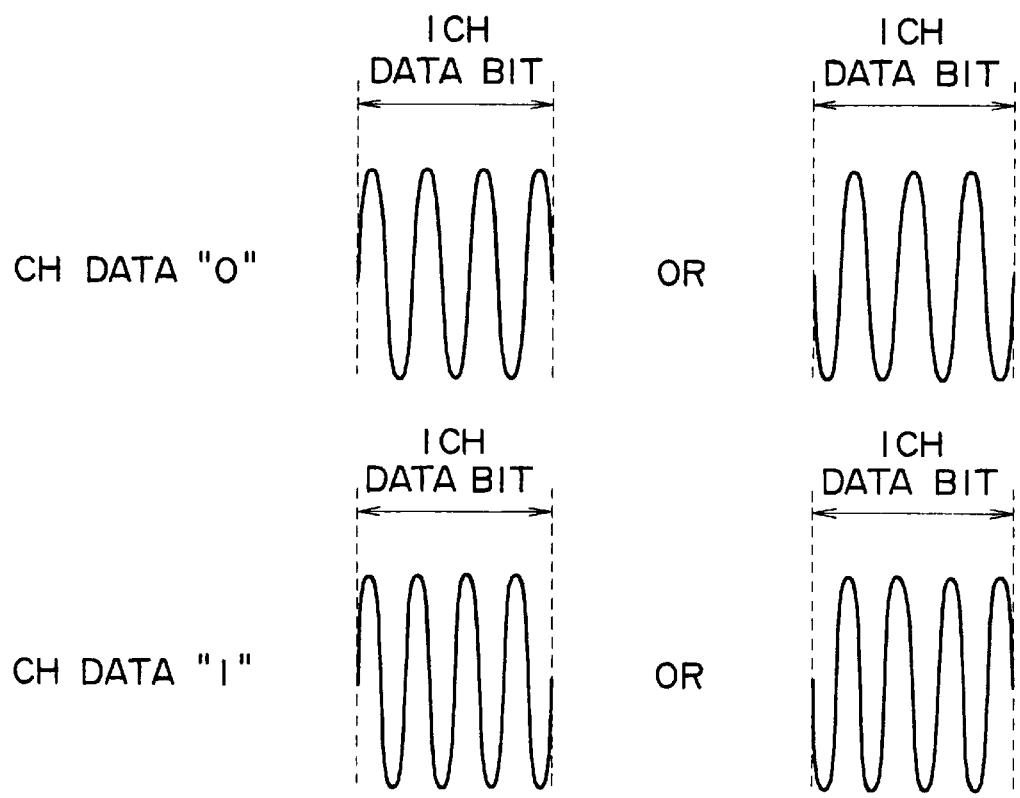
FIG. 6 is a schematic diagram for explaining frequency modulation performed in an FM modulator 15 in FIG. 3.

As shown in FIG. 6, the FM modulator 15 further performs frequency modulation of the carrier, which is supplied thereto from the divider 14, in accordance with the biphase signal shown in FIGS. 4 or 5.

More specifically, if the channel bit data (biphase signal) is 0, the FM modulator 15 outputs a carrier of 3.5 waves during a period corresponding to half the length of one data bit. It is assumed here that the carrier of 3.5 waves begins with a positive or negative half wave.

Meanwhile, if the channel bit data (biphase signal) is 1, a carrier of 4 waves is outputted during a period corresponding to half the length of one data bit. It is assumed here that such carrier of 4 waves begins also with a positive or negative half wave.

Therefore, the FM modulator 15 outputs, when channel data bits 00 are inputted correspondingly to data 0, 7 (=3.5+3.5) frequency-modulated waves during a period corresponding to the data bit length, or outputs 8 (=4+4) frequency-modulated waves when channel data bits 11 are inputted. Meanwhile, when channel data bits 10 or O1 are inputted correspondingly to data 1, the FM modulator 15 outputs 7.5 (=4+3.5=3.5+4) frequency-modulated waves.

The carrier of 57.6 kHz inputted to the FM modulator 15 corresponds to 7.5 waves, and then the FM modulator 15 produces, in accordance with such data, a carrier of 7.5 waves or 7 or 8 frequency-modulated waves having a deviation of ±6.67% (=0.5/7.5) therefrom.

As described, either carrier continuous with the preceding signal is selected out of the carrier that corresponds to the channel data 0 and begins with a positive half wave, and the carrier that corresponds to the channel data 1 and begins with a negative half wave.

Figure 7:
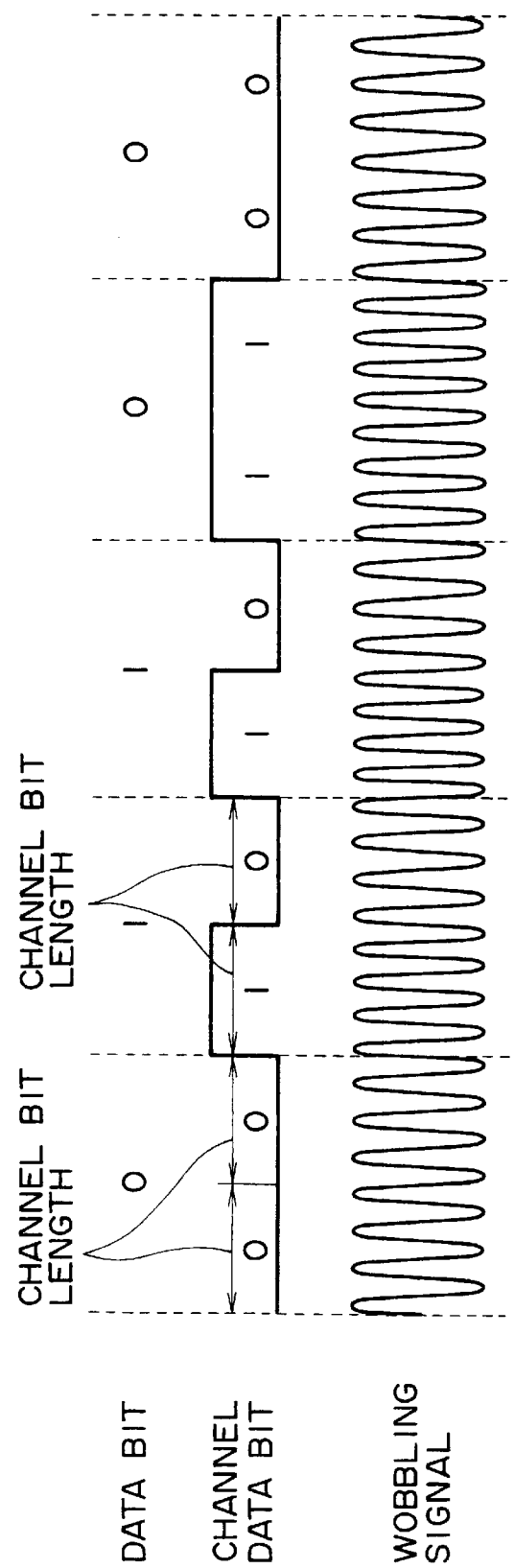
FIG. 7 shows frequency-modulated waves outputted from the FM modulator 15 in FIG. 3.

FIG. 7 shows an example of frequency-modulated waves thus outputted from the FM modulator 15. In this example, the first data bit is 0, and the channel data bits are 00. In regard to the first channel data bit 0, there is selected a 3.5-wave carrier which begins with a positive half wave at its initial point. As a result, this carrier ends with a positive half wave at its terminal point. And in regard to the next channel data bit 0, there is selected a 3.5-wave carrier which begins with a negative half wave, so that a total of 7 frequency-modulated waves are outputted in regard to the data bit 0.

Next, a data bit 1 (channel data bits 10) follows the above data bit 0. Since the 3.5 waves of the channel data bit 0 corresponding to the preceding data bit 0 end with a negative half wave, the 4-wave carrier of the first channel data bit 1 corresponding to the data bit 1 is so selected as to begin with a positive half wave. Further, since the 4 waves of the channel data bit 1 end with a negative half wave, the 4-wave carrier of the next channel data bit 0 is so selected as to begin with a positive half wave.

Thereafter, similarly to the above, 7.5-wave, 8-wave and 7-wave carriers are outputted correspondingly to the data bit 1 (channel data bits 10), data bit 0 (channel data bits 11) and data bit 0 (channel data bits 00), respectively, in such a manner as to be continuous at each boundary (initial point and terminal point) of the data bits.

In this embodiment, as shown in FIG. 7, the channel bit length is set to an integral multiple of a half of the carrier wavelength in the case of any of the 7-wave, 7.5-wave and 8-wave carriers. More specifically, the channel bit length is set to be 7 times the half of the 7-wave carrier (frequency-modulated waves) and 8 times the half of the 8-wave carrier (frequency-modulated waves). And the channel bit length is set to 7 times (when the channel bit is 0) or 8 times (when the channel bit is 1) the half of the wavelength of the 7.5-wave carrier.

In this embodiment, it is so contrived that the boundary (terminal point or initial point) of the biphase-modulated channel bit becomes a zero-crossing point of the frequency-modulated wave. Consequently, the phase of the address data (channel bit data) and the phase of the frequency-modulated wave are rendered mutually coincident, whereby the boundary of the bits can be identified with facility to eventually prevent erroneous detection of the address data bits, hence achieving exact reproduction of the address information.

Further in this embodiment, the boundary (initial point and terminal point) of the data bits corresponds to the edge (zero-crossing point) of the frequency-modulated wave, so that it is possible to generate a clock signal with reference to the edge of the frequency-modulated wave. However, in this embodiment, a clock signal is generated on the basis of clock sync marks, as will be described later with reference to FIG. 9.

Figure 8:
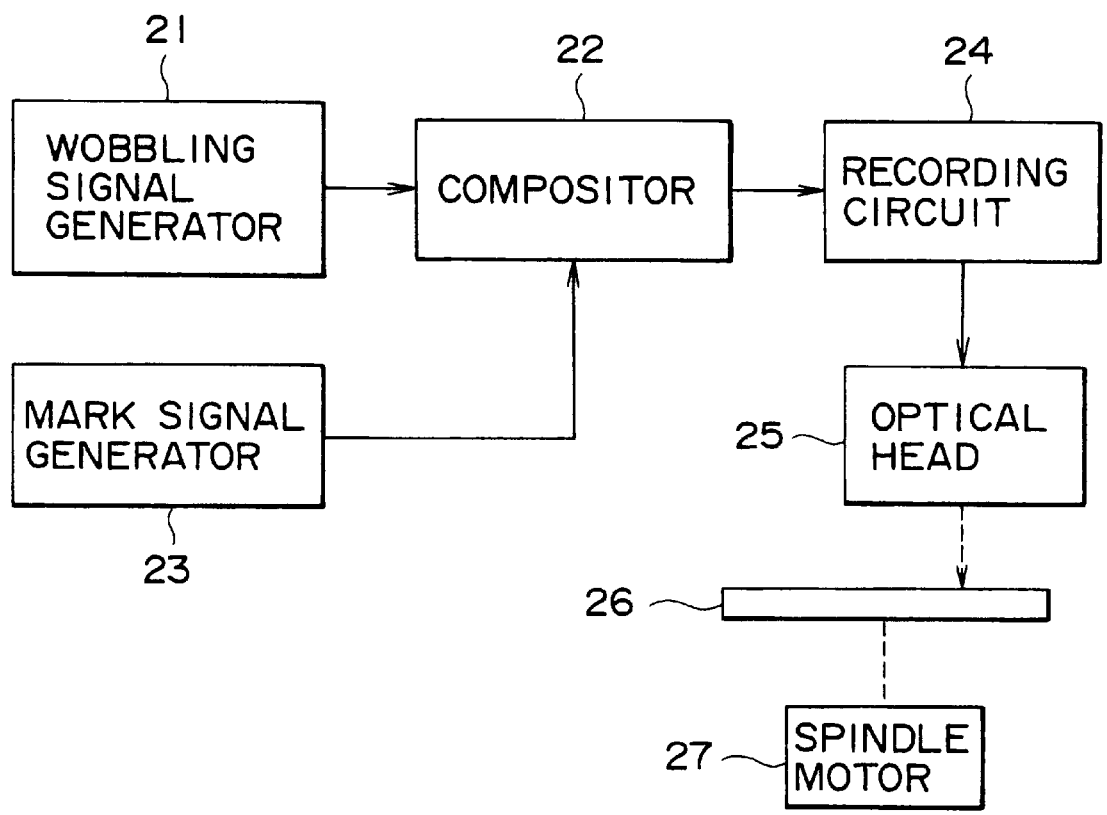
FIG. 8 shows an exemplary structure of a recording apparatus for manufacture of a disk 1 having a pregroove.

FIG. 8 shows an exemplary structure of a recording apparatus (disk formatting apparatus) for manufacture of a disk 1 having a pregroove. A wobbling signal generator 21 has the aforementioned structure shown in FIG. 3, and supplies the frequency-modulated signal, which is outputted from the FM modulator 15, to a compositor 22. A mark signal generator 23 generates a clock sync mark signal at a predetermined timing and outputs the same to the compositor 22. Subsequently the compositor 22 serves to composite the frequency-modulated signal, which is obtained from the wobbling signal generator 21, with the clock sync mark signal obtained from the mark signal generator 23, and then outputs the result to a recording circuit 24.

Figure 9:
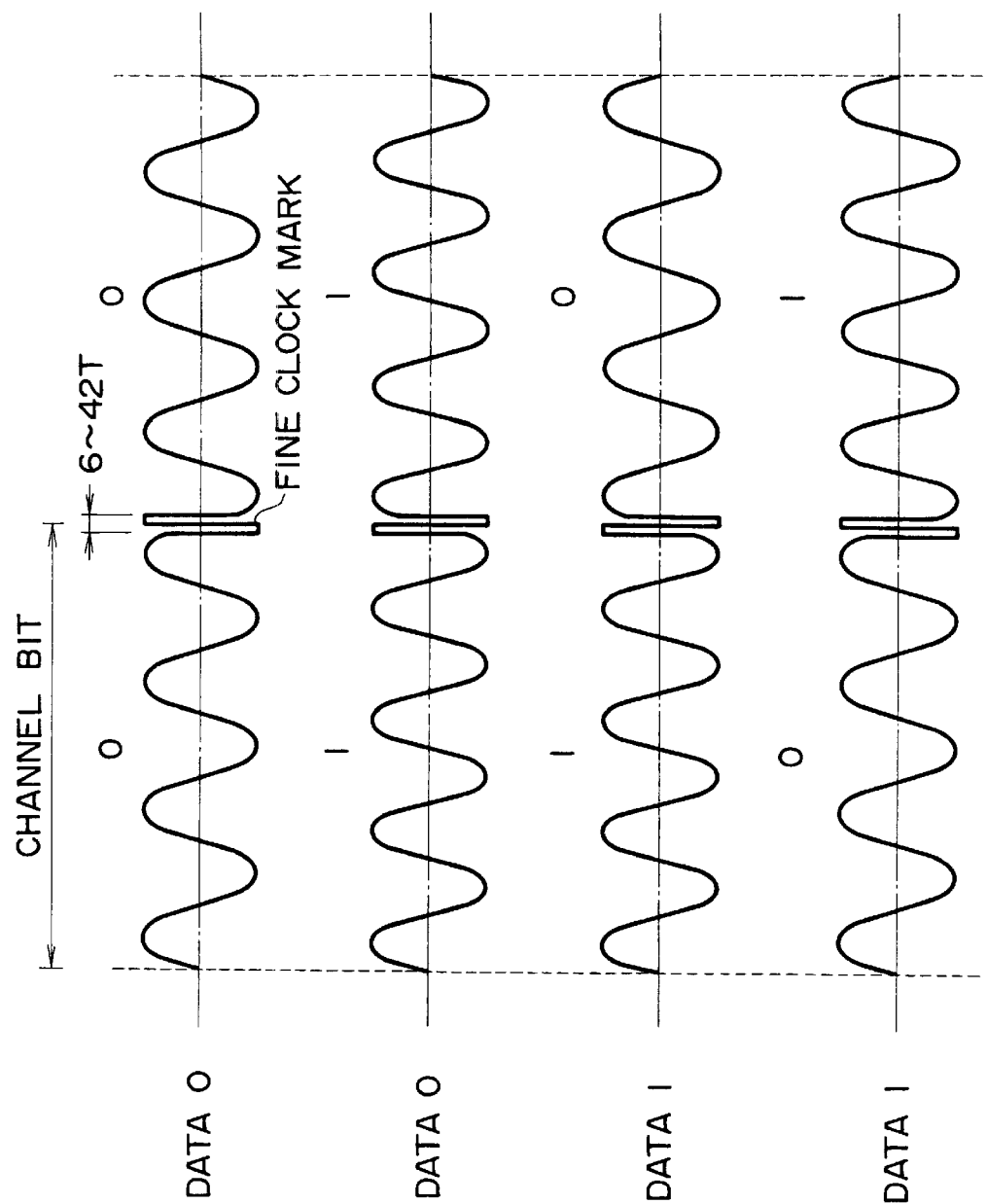
FIGS. 9A to 9D schematically explain the operation of a compositor 22 in FIG. 8.

When supplied with the clock sync mark signal, the compositor 22 composites the clock sync mark (Fine Clock Mark) with the carrier obtained from the wobbling signal generator 21, as shown in FIG. 9. Supposing that data to be recorded and/or reproduced are modulated by EFM (Eight To Fourteen (8–14) Modulation)+, the length of the clock sync mark is set in a range of 6 to 42T (where T denotes the length of a bit cell).

More specifically, when channel bit data are 00 (data 0), 11 (data 0), 10 (data 1) or 01 (data 1) as shown in FIGS. 9A to 9D, a clock sync mark of a frequency higher than the address information modulation frequency (57.6 kHz) is composited at the zero-crossing point of the carrier in the center (channel bit switching point) of the individual data. The clock sync mark signal is recorded per data bit or per predetermined number of data bits in such a manner that a plurality of clock sync marks are existent in one address frame.

Thus, a clock sync mark is inserted at the zero-crossing point of the wobbling frequency-modulated wave corresponding to the center (channel data bit switching point) of the address data as described, whereby any amplitude variation of the clock sync mark is reduced to consequently facilitate detection thereof.

In the FM modulator 15, it is assumed now that, when the channel data bit is 0, frequency modulation is performed with a frequency deviation of, e.g., −5% from the center frequency, and when the channel data bit is 1, frequency modulation is performed with a deviation of +5%. Then, no coincidence is attained between the boundary of the data bits or the channel data bits and the zero-crossing point of the frequency-modulated wave, and the channel data bit (or data bit) is prone to be detected erroneously. Further, the position of insertion of the clock sync mark may fail to coincide with the zero-crossing point and is superimposed on a point having a predetermined amplitude in the frequency-modulated wave. As a result, the level of the clock sync mark is increased or decreased correspondingly to that amplitude, whereby the detection thereof is rendered difficult. According to this embodiment, however, the clock sync mark is positioned exactly at the zero-crossing point of the frequency-modulated wave, so that its detection (discrimination from the frequency-modulated wave) is facilitated.

The recording circuit 24 controls an optical head 25 in accordance with the signal supplied from the compositor 22, thereby generating a laser beam to form a pregroove (including clock sync marks) on a master 26. A spindle motor 27 is so controlled as to rotate the master 26 at a constant angular velocity (CAV).

More specifically, the frequency-modulated signal obtained from the wobbling signal generator 21 is composited, in the compositor 22, with the clock sync mark signal outputted from the mark signal generator 23, and then is supplied to the recording circuit 24. Subsequently the recording circuit 24 controls the optical head 25 in accordance with the signal inputted from the compositor 22, thereby generating a laser beam. The laser beam thus generated from the optical head 25 is irradiated onto the master 26 rotated by the spindle motor 27 at a constant angular velocity.

Thereafter the master 26 is developed, then a stamper is produced from such master 26, and a multiplicity of replicas as disks 1 are produced from the stamper. In this manner, there is manufactured the disk 1 having the pregroove 2 thereon with the aforementioned clock sync marks.

Figure 10:
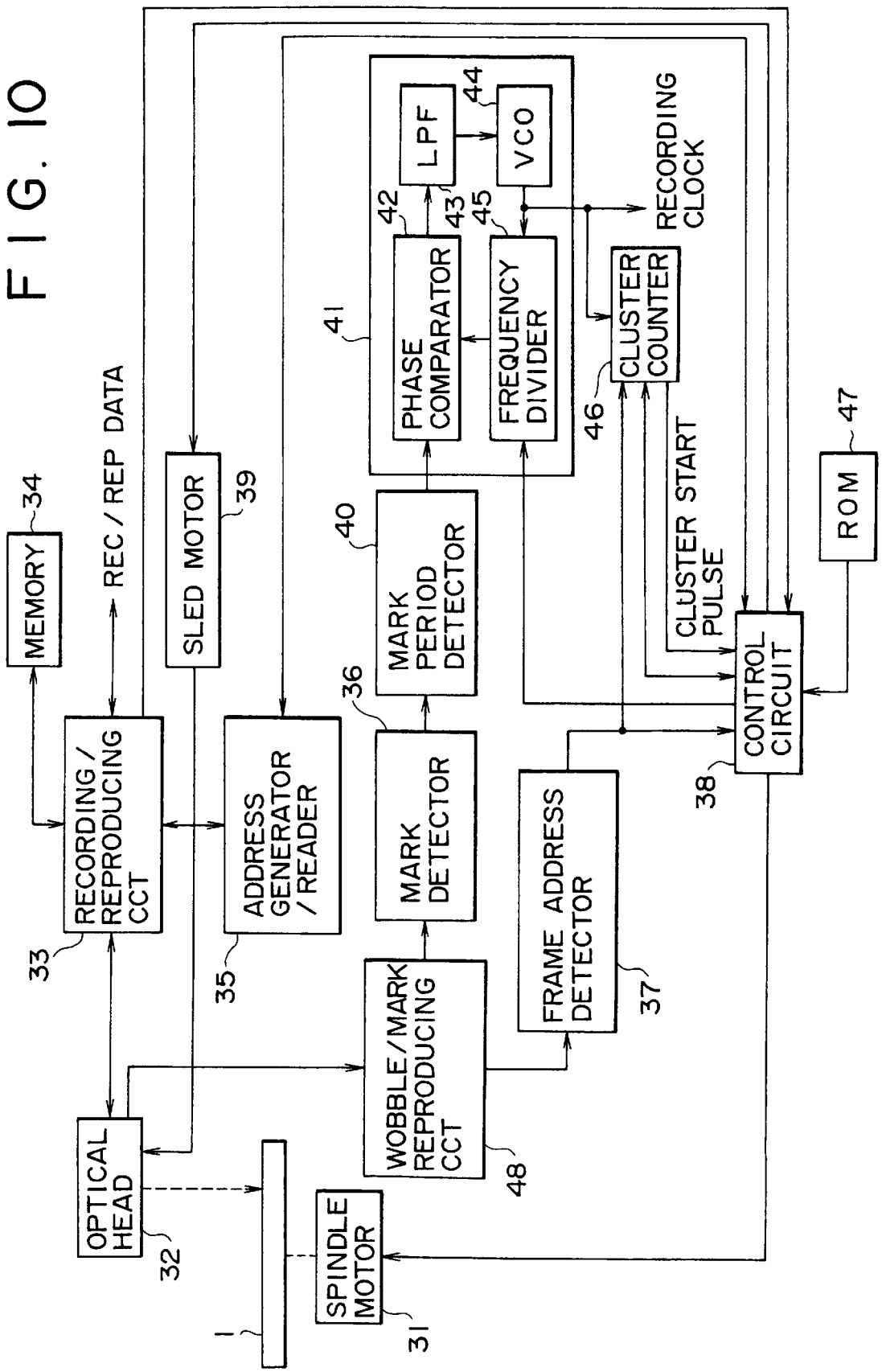
FIG. 10 is a block diagram showing an exemplary structure of an optical disk recording/reproducing apparatus where the recording/reproducing apparatus of the present invention is applied.

FIG. 10 shows an exemplary structure of an optical disk recording/reproducing apparatus which records data on and/or reproduces the same from the disk 1 thus obtained. A spindle motor 31 serves to rotate the disk 1 at a predetermined angular velocity. An optical head 32 irradiates a laser beam onto the disk 1 to record data on the disk 1, and reproduces the data from the reflected beam. A recording/reproducing circuit 33 once stores in a memory 34 the record data inputted from an unshown device and, upon completion of storing the data of 1 cluster (or data of 1 sector) as a recording unit in the memory 34, reads out the data of 1 cluster therefrom. Then the circuit 33 modulates such data by a predetermined method, and outputs the same to an optical head 32. Further the circuit 33 demodulates the data received from the optical head 32, and then outputs the demodulated data to an unshown device.

An address generator/reader 35 generates a data address (sector address) (described later with reference to FIG. 13) to be recorded in the track (pregroove 2) under control of a control circuit 38, and outputs the address to the recording/reproducing circuit 33. Subsequently this circuit 33 adds the address to the record data supplied from an unshown device, and then outputs the same to the optical head 32. When the address data are included in the data reproduced from the track on the disk 1 by the optical head 32, the circuit 33 separates the address data and outputs the same to the address generator/reader 35, which then outputs the read address to the control circuit 38.

A wobble/mark reproducing circuit 48 reproduces, from the RF signal reproduced by and outputted from the optical head 32, the signal to be supplied to a mark detector 36, and also reproduces the signal to be supplied to a frame address detector 37, and then outputs the reproduced signals to the respective detectors.

The mark detector 36 detects, from the RF signal reproduced by and outputted from the wobble/mark reproducing circuit 48, a signal component corresponding to the clock sync mark. Meanwhile the frame address detector 37 reads, from the output RF signal of the wobble/mark reproducing circuit 48, the address information (track number and frame number in FIG. 2) included in the wobbling signal, and then supplies the read information to a cluster counter 46 and the control circuit 38.

A mark period detector 40 makes a decision relative to the periodicity of a detection pulse outputted upon detection of a clock sync mark by the mark detector 36. More specifically, since clock sync marks are generated in a fixed period, the detector 40 makes a decision as to whether the detection pulse inputted from the mark detector 36 is the one generated in the fixed period. And if the result of this decision signifies that the detection pulse is the one generated in the fixed period, the detector 40 generates a pulse synchronized with the detection pulse and then outputs the same to a phase comparator 42 in a PLL circuit 41 of the following stage. In case none of detection pulses is inputted in the fixed period, the detector 40 generates a false pulse at a predetermined timing so that the PLL circuit 41 of the following stage may not be locked to any improper phase.

The PLL circuit 41 has, in addition to the phase comparator 42, a low pass filter (LPF) 43, a voltage-controlled oscillator (VCO) 44 and a frequency divider 45. The phase comparator 42 compares the phase of the input from the mark period detector 40 with the phase of the input from the frequency divider 45, and then outputs the phase error therebetween. The low pass filter 43 smooths the phase error signal supplied from the phase comparator 42, and outputs the same to the VCO 44. Subsequently the VCO 44 generates a clock signal of the phase corresponding to the output of the low pass filter 43, and supplies the clock signal to the frequency divider 45. Then the frequency divider 45 divides the frequency of the input clock signal, which is supplied from the VCO 44, by a predetermined value (specified by the control circuit 38), and outputs the result of such frequency division to the phase comparator 42.

The clock signal outputted from the VCO 44 is supplied to the related circuits while being supplied also to a cluster counter 46. The cluster counter 46 counts the number of clock pulses, which are outputted from the VCO 44, with reference to the frame address supplied from the frame address detector 37, and generates a cluster start pulse when the count has reached a preset value (corresponding to the length of 1 cluster). This cluster start pulse is outputted to the control circuit 38.

A sled motor 39 is controlled by the control circuit 38 in such a manner as to move the optical head 32 to a desired track position on the disk 1. The control circuit 38 serves to control the spindle motor 31 for rotating the disk 1 at a predetermined angular velocity (CAV).

In a ROM 47, there is stored a table which prescribes the relationship of correspondence between track numbers (FIG. 2) in address frames and zones formed by dividing a data recording area of the disk 1.

Figure 11:
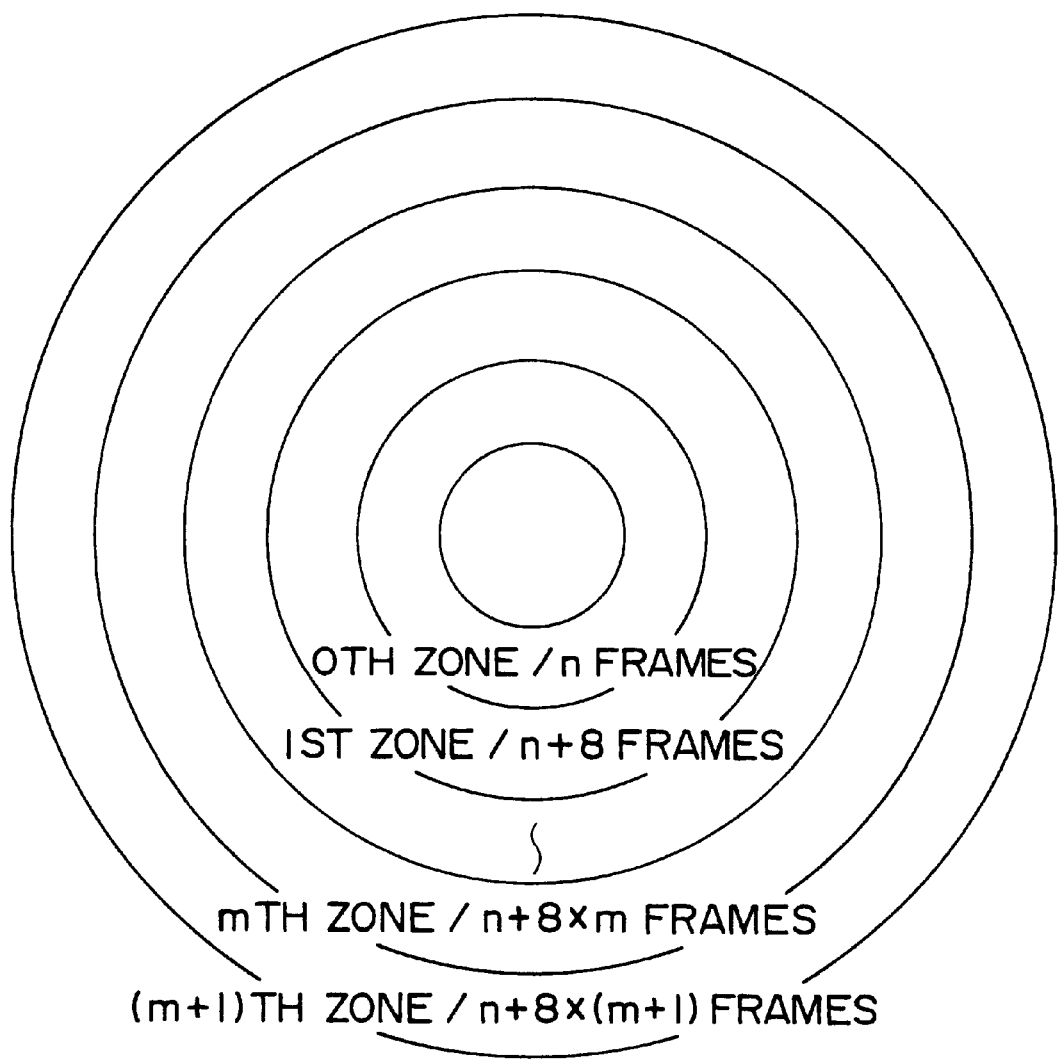
FIG. 11 is a schematic diagram for explaining zones on a disk.

More specifically, as illustrated in FIG. 11, the control circuit 38 divides the disk 1 into a plurality of zones (in this embodiment, a total of m+2 zones ranging from 0th zone to (m+1)th zone), where data are recorded and/or reproduced. Supposing here that the number of data frames per track in the 0th zone is n (the data frame is used as a data block unit and is different from the address frame described with reference to FIG. 2), the number of data frames per track in the next 1st zone becomes n+8. Thereafter, similarly to the above, the number of data frames in the outer zone increases by 8 as compared with that in the adjacent inner zone. And finally, n+8×(m+1) data frames are existent in the outermost (m+1)th zone.

The 0th zone is switched to the 1st zone at the radial position where a capacity of n+8 frames can be obtained with the same linear density as the innermost circumferential linear density in the 0th zone. Thereafter, similarly to the above, the preceding zone is switched to the mth zone at the radial position where a capacity of n+8×m frames can be obtained with the same linear density as the innermost circumferential linear density in the 0th zone.

In an example where the radius of the disk 1 usable as a recording/reproduction area ranges from 24 mm to 58 mm with a track pitch of 0.87 $\mu$m and a linear density of 0.38 $\mu$m/bit, the recording/reproduction area is divided into 93 zones. In the 0th zone corresponding to the disk radius of 24 mm, 520 frames are formed per track (per rotation), and 8 frames are increased per track in accordance with an increment of one zone.

As will be described later, since 1 sector is composed of 24 frames (data frames) in this embodiment, the number of frames (=8) incremented per zone is set to a value smaller than the number of the frames (=24) constituting 1 sector. Therefore, it becomes possible to form a larger number of zones in finer units to consequently realize a greater capacity of the disk 1. This method is termed zone CLD (Constant Linear Density).

In this embodiment, the number of tracks in each zone is set to be equal to the number of data frames (420 frames) which constitute a recording/reproduction unit. However, the number of tracks may be set to an integral multiple of the number of data frames. Consequently, there arises no problem of generating any surplus data frame, and an integral number of recording/reproduction units (blocks) are arranged in each zone, hence enhancing the zoning efficiency. As a result, it becomes possible to attain an adequate capacity which is greater than the value in the zone CAV and approximate to the value in the zone CLV although being smaller than the latter.

Due to such enhanced zoning close to the CLV, clock frequency variation caused between any zone and the next one is reduced, and when reproduction is performed in an exclusive apparatus for the CLV, the clock signal can be extracted even between zones where the clock frequency is varied, so that continuous reproduction between the zones is rendered possible.

Hereinafter an explanation will be given on the operation of the embodiment shown in FIG. 10. The optical head 32 irradiates a laser beam onto the optical disk 1, and outputs an RF signal obtained from the reflection of the laser beam. The wobble/mark reproducing circuit 48 extracts a frame address detection component from the RF signal, and then outputs the extracted signal component to the frame address detector 37. Subsequently the frame address detector 37 reads out the wobbling information (address information) from the signal component and outputs the result to the control circuit 38 while supplying the same also to the cluster counter 46.

Further the wobble/mark reproducing circuit 48 extracts a mark detection component from the RF signal, and then outputs the extracted signal component to the mark detector 36. Subsequently the mark detector 36 detects the clock sync mark (fine clock mark in FIG. 9) from the signal component and supplies the same to the mark period detector 40.

The mark period detector 40 makes a decision relative to the periodicity of the clock sync mark, then generates a predetermined pulse in accordance with the result of such decision, and outputs the pulse to the PLL circuit 41. Thereafter the PLL circuit 41 produces a clock signal (recording clock) synchronized with the input pulse and then supplies the same to the cluster counter 46.

The control circuit 38 can detect the position of a reference clock sync mark on one track (in one rotation) from the frame address (frame number) supplied from the frame address detector 37. For example, with reference to the clock sync mark detected first from the number-0 frame (address frame), any position on the track (any position in one rotation) can be accessed on the basis of the count value of the recording clock pulses.

Figure 12:
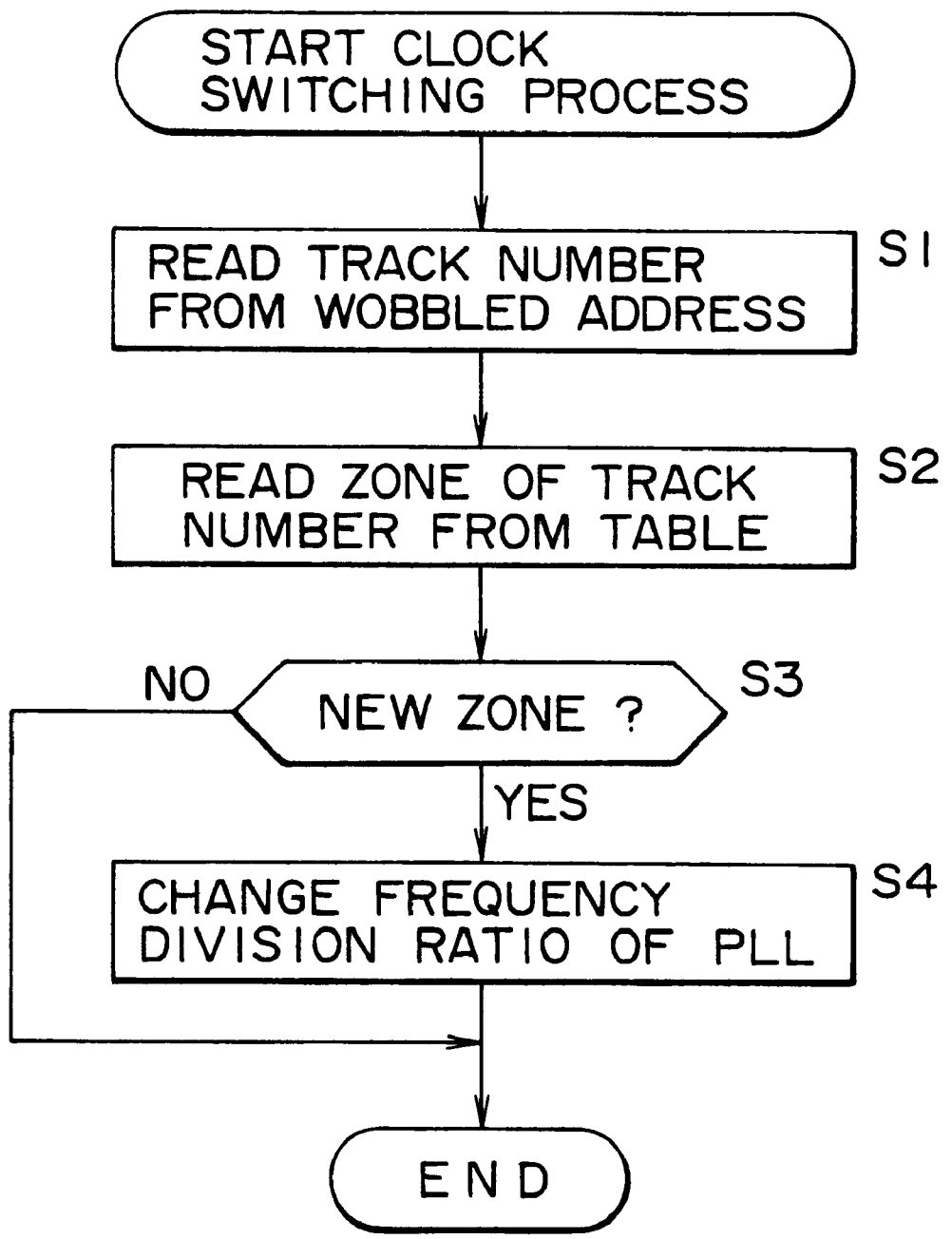
FIG. 12 is a flowchart for explaining how a clock switching process is executed in the embodiment of FIG. 10.

When a desired position on one track is accessed as described, it is necessary to make a decision as to which zone the access point belongs to and further to enable the VCO 44 to generate a clock signal of a frequency corresponding to that zone. For this purpose, the control circuit 38 further executes a clock switching process as shown in a flowchart of FIG. 12.

More specifically, first at step S1, the control circuit 38 reads out the track number from the frame address of the access point outputted from the frame address detector 37. Subsequently at step S2, the control circuit 38 reads out the zone, which corresponds to the track number read out at step S1, from the table stored in the ROM 47. As mentioned, the table stored in the ROM 47 includes the information that represents the mutual correspondence between the numbered tracks and the zones ranging, e.g., from 0th to 92nd zones.

At step S3, a decision is made as to whether the track number thus read corresponds to a new zone which is different from the zone accessed until then. And if the result of this decision signifies a new zone, the operation proceeds to step S4, where the control circuit 38 controls the frequency divider 45 to set a frequency division ratio corresponding to the new zone. In this manner, a recording clock signal of a different frequency relative to an individual zone is outputted from the VCO 44.

When the result of the decision at step S3 signifies that the current zone is not a new one, the process of step S4 is skipped. That is, the division ratio of the frequency divider 45 is left unchanged.

Now the format of record data will be described below. In this embodiment, as mentioned above, data are recorded in unit of a cluster (32 kilobytes). Each cluster is composed as follows.

Figure 13:
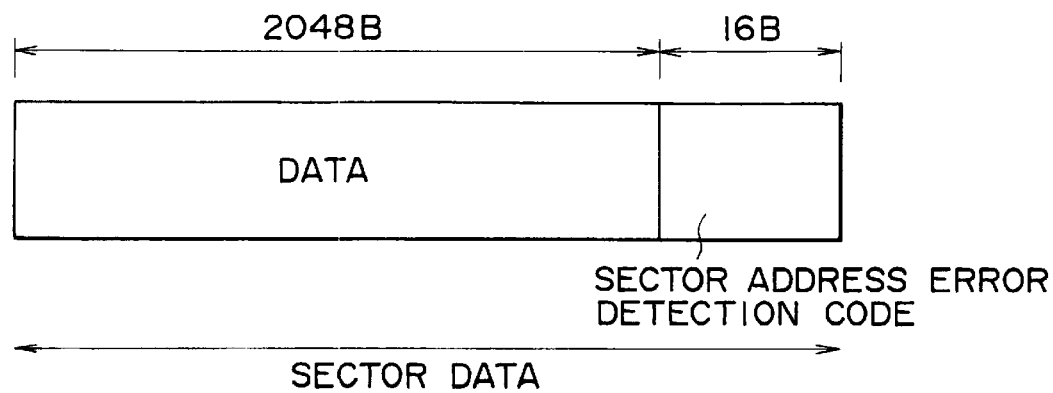
FIG. 13 is a schematic diagram for explaining a data format of one sector.

Data of 2 kilobytes (2048 bytes) are extracted as data of 1 sector, to which an overhead of 16 bytes is added as shown in FIG. 13. This overhead includes a sector address (generated or read by the address generator/reader 35 in FIG. 10) and an error detection code used for detecting any error.

Figure 14:
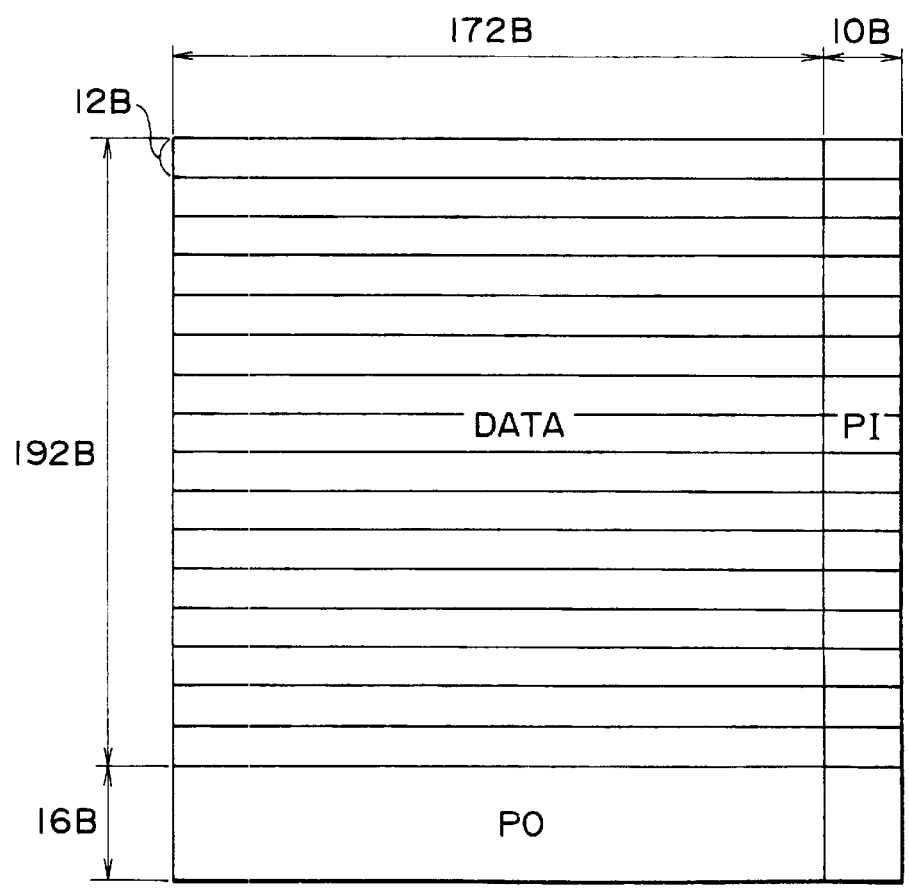
FIG. 14 is a schematic diagram for explaining the composition of 32-kilobyte data.

Such data of a total of 2064 (=2048+16) bytes are arrayed to be data of 12×172 (=2064) bytes, as shown in FIG. 14. And data of 16 sectors are grouped together to form data of 192 (=12×16)×172 bytes. Further an inner code (PI) of 10 bytes and an outer code (PO) of 16 bytes are added to the data of 192×172 bytes to serve as parity codes for the individual bytes in the horizontal and vertical directions.

Furthermore, the outer code (PO) of 16×182 bytes in the blocked data of 208 (=192+16)×182 (=172+10) bytes is divided into 16 portions each composed of data of 1×182 bytes and, as shown in FIG. 15, such 16 portions are added, one by one, under 16 data sectors numbered 0 to 15 each composed of 12×182 bytes, whereby the data are interleaved. In this example, data of 13 (=12+1)×182 bytes constitute 1 sector.

Figure 16:
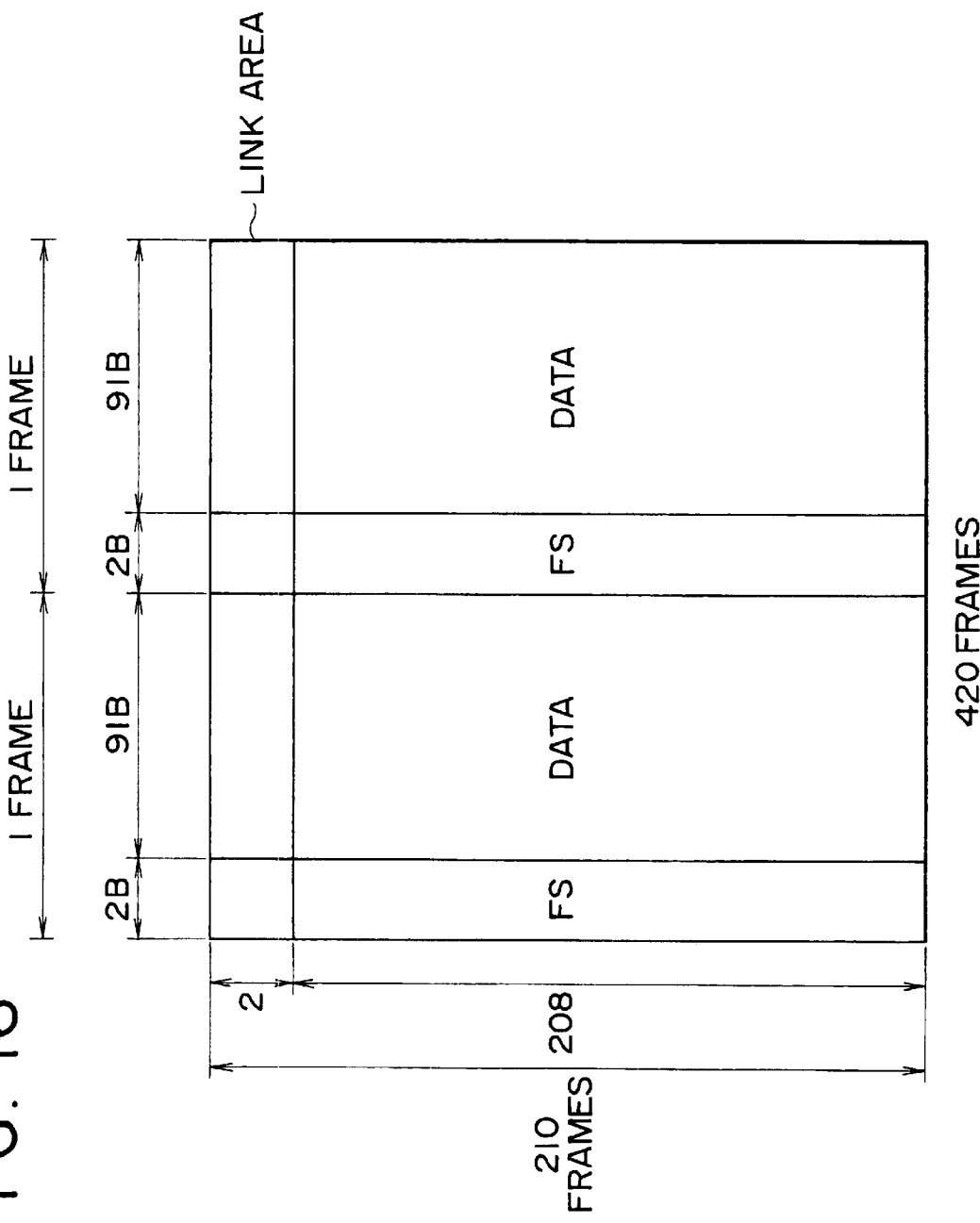
FIG. 16 is a schematic diagram for explaining the composition of data of a 32-kilobyte block.

The data of 208×182 bytes shown in FIG. 15 are divided vertically into two as shown in FIG. 16, in such a manner that data of 91 bytes constitute 1 frame, and the entire data constitute 208×2 frames. Link data (data of a link area) of 2×2 frames are added to the top of such data of 208×2 frames. (More exactly, as will be described later with reference to FIG. 17, 4-frame data are partially recorded at the top of the cluster, and the rest are recorded at the last of the cluster.) Further a 2-byte frame sync signal (FS) is added to the top of the 91-byte frame data. Consequently, as shown in FIG. 16, the 1-frame data are composed of 93 bytes in total, so that the block data are composed of 210 (=208+2)×(93×2) bytes (420 frames) in total. These data constitute 1 cluster (block as a recording unit). The real data part except the overhead is composed of 32 kilobytes (=2048× 16/1024 kilobytes).

Thus, in this embodiment, each cluster is composed of 16 sectors, and each sector is composed of 24 frames.

Figure 17:
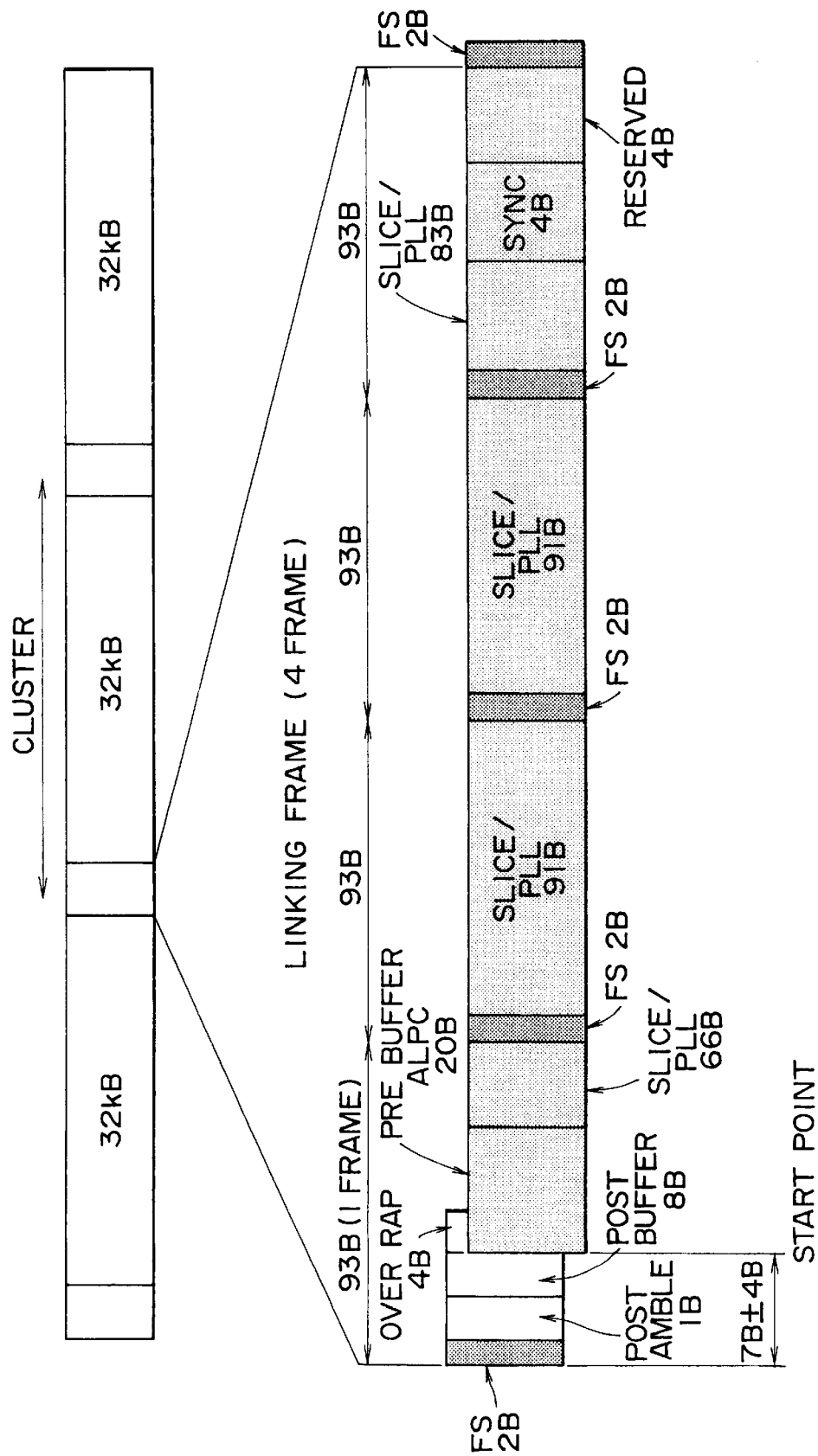
FIG. 17 shows an exemplary structure of a link area.

Since such data are recorded in units of clusters on the disk 1, a link area is formed, as shown in FIG. 17, between mutually adjacent clusters.

As shown in FIG. 17, a link area is composed of 4 frames (data frames), and the data of each frame are composed of 93 bytes as in the case of a data area (in a cluster). And a 2-byte frame sync signal (FS) (Frame Sync) is recorded at the top of each frame.

In the link area, 86-byte and 3-frame data are additionally recorded anterior to a 32-kilobyte data block (cluster). Out of the 86-byte data, the first 20 bytes are used as a prebuffer (Prebuffer) and an ALPC (Automatic Laser Power Control). The prebuffer serves to absorb any deviation of the start point caused in the cluster by jitters, and the ALPC is a recording power setting area where data are recorded for setting the laser beam output in a recording or reproducing mode to a predetermined value.

The next 66 bytes are used for Slice/PLL. The Slice represents data to set a time constant for binary-coding the reproduced data, and the PLL represents data for reproducing the clock signal.

Each of the succeeding 2 frames is used for Slice/PLL. In the last 1 frame, the top 83 bytes are used for Slice/PLL, the next 4 bytes for a sync signal (Sync), and the last 4 bytes are held as Reserve for the future.

After the 32-kilobyte (cluster) data block, there are formed a 2 byte frame sync signal, a 1 byte postamble and an 8 byte postbuffer. In the postamble, data are recorded for adjusting the last data mark length and returning the signal polarity. The postbuffer is a buffer area for absorbing any jitters derived from eccentricity or the like. In an ideal state where no jitter is existent at all, 4 bytes in the entire 8-byte postbuffer are overlapped, and a prebuffer and an ALPC in the next cluster are recorded therein.

This link area may be applied to a ROM disk as well so that a common format is achievable for both of a ROM disk and a RAM disk. Then, in the case of a ROM disk, information can be recorded in a postbuffer, a prebuffer and an ALPC of the link area. For example, it is possible to record addresses therein to enhance the address information probability.

Figure 18:
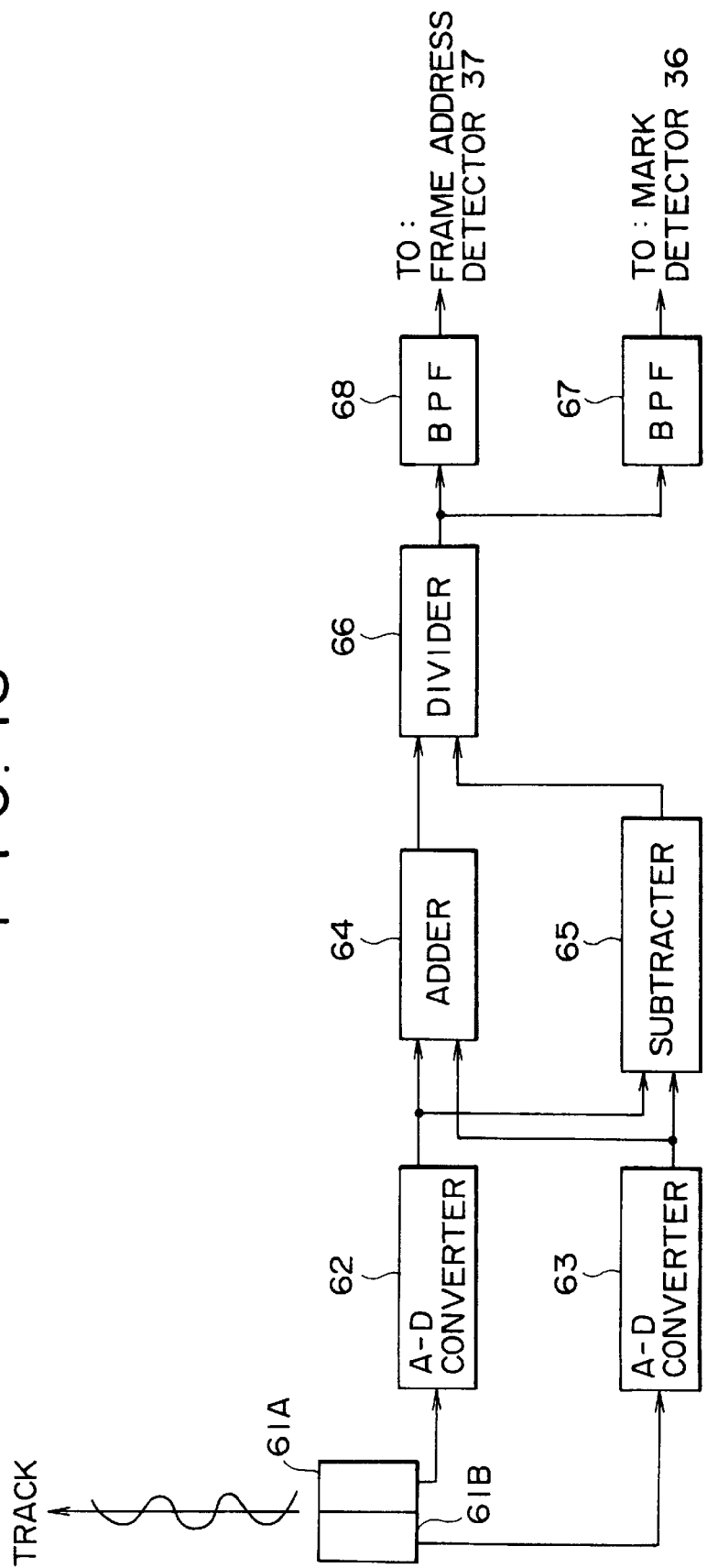
FIG. 18 is a block diagram showing an exemplary structure of a wobbled mark reproducing circuit 48 in FIG. 10.

Hereinafter an explanation will be given on the further detailed structure and operation of the wobble/mark reproducing circuit 48. This circuit 48 has such a configuration as shown in FIG. 18 for example. A light receiving element 61 incorporated in the optical head 32 is divided into two light receiving elements 61A and 61B which are disposed in parallel with a track so as to be capable of principally detecting the right-side component and the left-side component, respectively, of the track. The output of the light receiving element 61A is supplied to an A-D converter 62 where the analog signal is converted into a digital signal, which is then outputted to an adder 64 and a subtracter 65. Similarly, the output of the other light receiving element 61B is supplied to an A-D converter 63 where the analog signal is converted into a digital signal, which is then outputted to the adder 64 and the subtracter 65. The adder 64 adds the signals supplied thereto from the A-D converter 62 and the A-D converter 63, and then outputs the result of such addition to a divider 66. Meanwhile the subtracter 65 subtracts the output of the A-D converter 63 from the output of the A-D converter 62, and then outputs the result of such subtraction to the divider 66.

The divider 66 divides the output signal of the subtracter 65 by the output signal of the adder 64. A band pass filter 67 extracts, out of the signal supplied from the divider 66, a frequency component corresponding to the fine lock mark (clock sync mark) described with reference to FIG. 9, and then outputs the extracted frequency component to the mark detector 36. A band pass filter 68 extracts, out of the signal supplied from the divider 66, a frequency component (of a band lower in frequency than the band extracted through the band pass filter 67) including the wobble signal component, and then outputs the extracted frequency component to the frame address detector 37.

Figure 19:
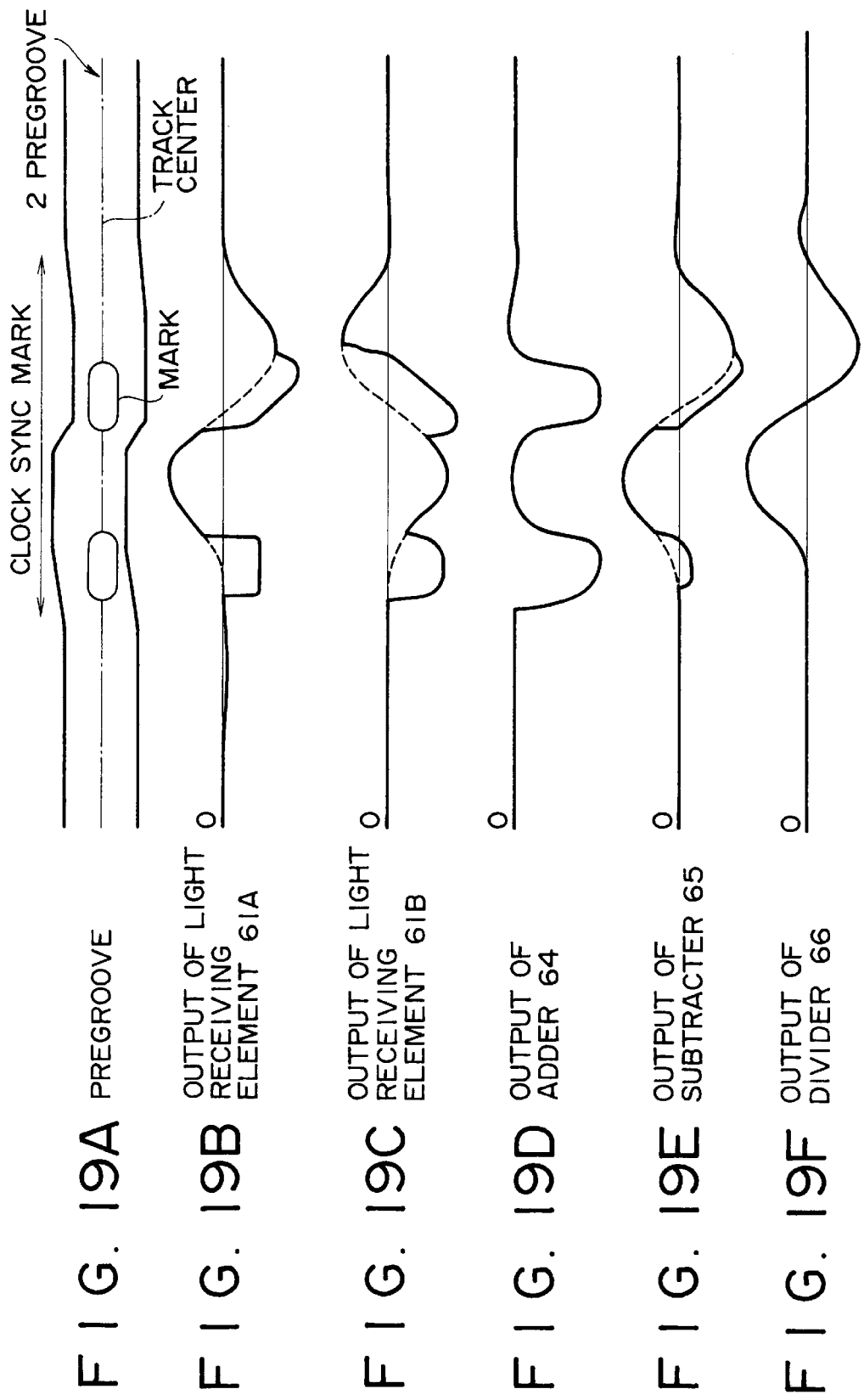
FIGS. 19A to 19F are timing charts of signals for explaining the operation of the embodiment shown in FIG. 18.

Next, the operation of the wobble/mark reproducing circuit 48 will be described below with reference to a timing chart of FIGS. 19A to 19F. Suppose now that, as shown in FIG. 19A, a mark (pit) corresponding to the record data is formed in the vicinity of a clock sync mark (fine clock mark) on the pregroove 2. At the position of this mark, the intensity of the laser beam irradiated from the optical head 32 onto the disk 1 is controlled to a value greater than that at any other position where no mark is to be formed.

At this time, the light receiving elements 61A and 61B, which are receiving the reflected beams from the disk 1, output signals shown in FIGS. 19B and 19C respectively. The output level of the light receiving element 61A is changed sinusoidally and smoothly in accordance with the fine clock mark, but is lowered at the position where the mark (pit) is formed.

Meanwhile, as shown in FIG. 19C, the fine clock mark component included in the output of the light receiving element 61B is a sinusoidal signal which is substantially in an opposite-phase state to the output of the light receiving element 61A shown in FIG. 19B. However, the output level of the element 61B relative to the component corresponding to the mark (pit) is also lowered in accordance with the mark, as in the aforementioned case of the light receiving element 61A. More specifically, in the light receiving elements 61A and 61B, the respective clock sync mark components (wobbled address components also) mutually have an opposite-phase relationship, but the respective mark (pit) components mutually have an in-phase relationship.

The adder 64 adds the output of the light receiving element 61A and that of the light receiving element 61B after analog-to-digital conversion thereof in the A-D converter 62 and the A-D converter 63 respectively, so that the clock sync mark information and the wobbled address information, which are mutually opposite-phase components, cancel each other as shown in FIG. 19D, whereby the mark (pit) component is extracted.

In contrast therewith, the result of subtracting, by the subtracter 65, the output of the light receiving element 61B from that of the light receiving element 61A is such as shown in FIG. 19E, where the basically in-phase mark (pit) components are eliminated, so that the mutually opposite-phase clock sync mark component and address information component are extracted.

However, at any position where a mark (pit) is to be formed, the laser beam intensity is set to a level higher than that in a reproduction mode as described, so that the reproduction level at any position without a mark and the reproduction level at any position with a mark fail to be continuous with each other, so that the mark components (in-phase components) are left in the output of the subtracter 65 without being sufficiently suppressed, as shown in FIG. 19E.

In order to avoid the above disadvantage, the divider 66 divides the output (FIG. 19E) of the subtracter 65 by the output (FIG. 19D) of the adder 64, hence extracting the sync mark component (address component) where the change corresponding to the mark component is sufficiently suppressed, as shown in FIG. 19F. That is, since the output of the adder 64 includes the intensity change component of the laser light corresponding to the record data, the output of the subtracter 65 is divided by the output of the adder 64 to consequently normalize the output of the subtracter 65, whereby the mark (pit) component can be suppressed.

In this manner, the output obtained from the divider 66 is the signal where the mark component is sufficiently suppressed. This signal includes both of the sync mark component and the wobbled address component.

Therefore, the component of the relatively higher frequency band corresponding to the sync mark component is extracted through the band pass filter 67. As a result, the wobbled address signal of the relatively lower frequency band is substantially not included in the output signal of the band pass filter 67, so that the mark detector 36 is rendered capable of detecting exactly the fine clock mark component from the output of the band pass filter 67.

Meanwhile the band pass filter 68 serves to extract therethrough the relatively lower frequency band of the wobbled address component from the output of the divider 66. Consequently, the fine clock mark component is substantially not included in the output of the band pass filter 68, whereby the frame address detector 37 is rendered capable of detecting the wobbled address component exactly.

In the reproduction mode also, basically the same operation as that described above is performed. Since the laser beam intensity is maintained constant in the reproduction mode, the fine clock marks and the wobbled addresses can be reproduced with more accuracy than in the recording mode.

Figure 20:
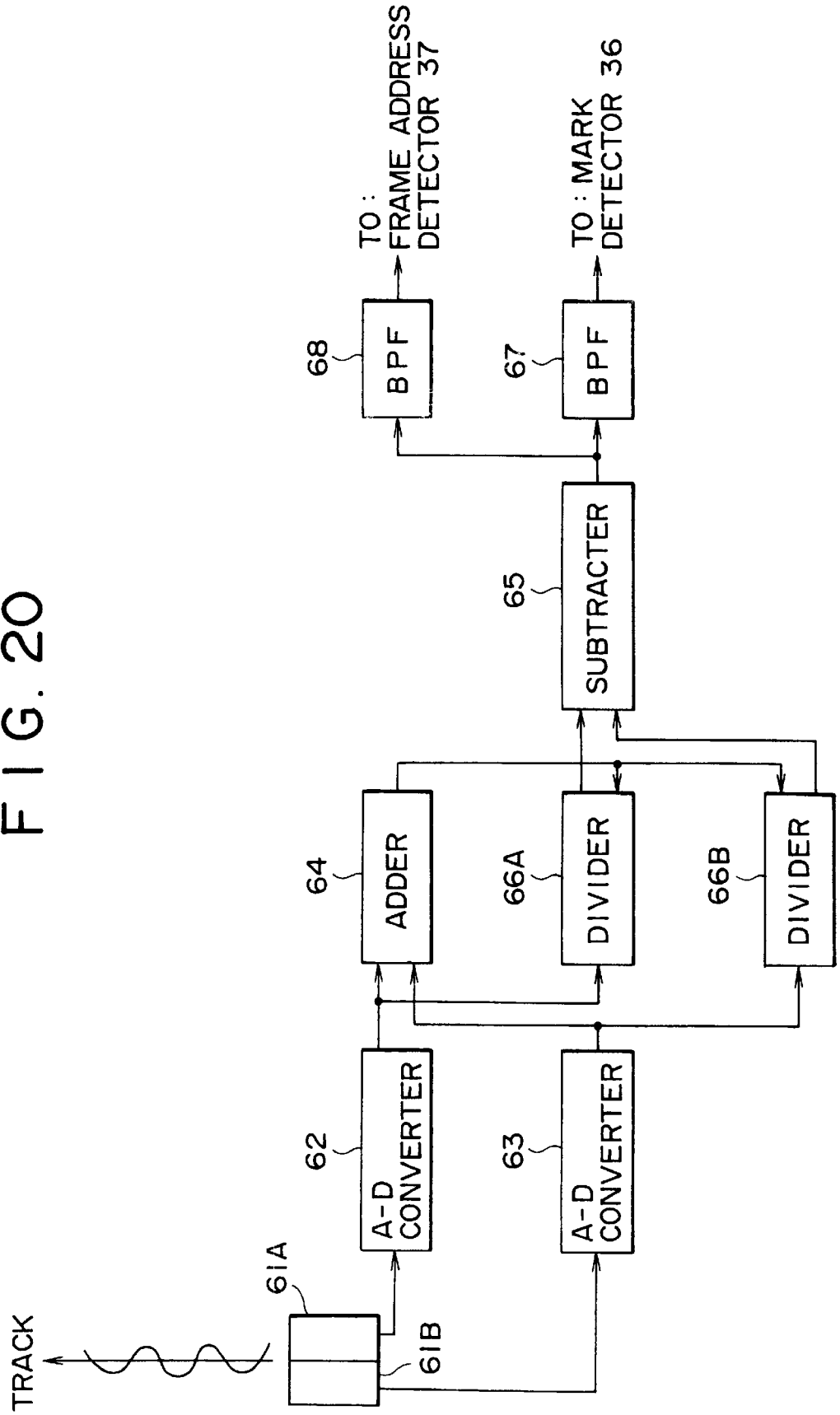
FIG. 20 is a block diagram showing another exemplary structure of the wobbled mark reproducing circuit 48 in FIG. 10.

FIG. 20 shows another embodiment of the wobble/mark reproducing circuit 48. In this embodiment, the output of an A-D converter 62 is supplied to a divider 66A, while the output of an A-D converter 63 is supplied to a divider 66B. And the output of an adder 64 is supplied to the dividers 66A and 66B. A subtracter 65 subtracts the output of the divider 66B from the output of the divider 66A, and then outputs the result of such division to band pass filters 67 and 68. The other structure is the same as that in FIG. 18.

More specifically, in the embodiment of FIG. 18, the output of the subtracter 65 is normalized through a division in the divider 66 by the output of the adder 64. However, in the embodiment of FIG. 20, the output of the A-D converter 62 itself is normalized through a division in the divider 66A by the output of the adder 64. Similarly, the output of the A-D converter 63 itself is normalized through a division in the divider 66B by the output of the adder 64.

In this manner, the outputs of the dividers 66A and 66B normalized previously are supplied to the subtracter 65, where the output of the divider 66B is subtracted from the output of the divider 66A. In this configuration also, it is possible to obtain a desired signal as in the aforementioned case of FIG. 18.

Figure 21:
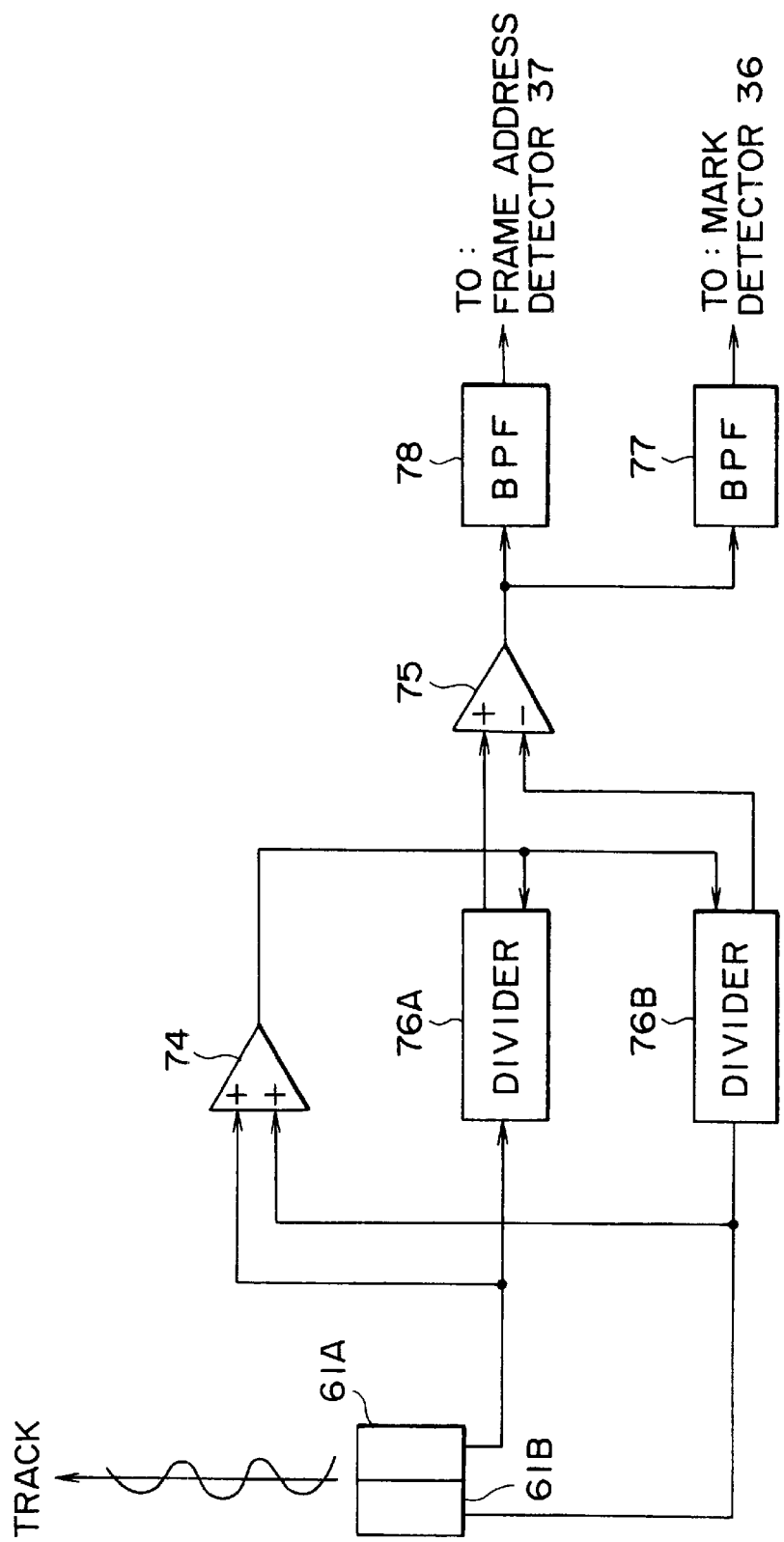
FIG. 21 is a block diagram showing a further exemplary structure of the wobbled mark reproducing circuit 48 in FIG. 10.

FIG. 21 shows a further embodiment of the wobble/mark reproducing circuit 48. This embodiment represents an example where the foregoing embodiment of FIG. 20 is modified to an analog structure. More specifically, in the embodiment of FIG. 21, the output of a light receiving element 61A and the output of a light receiving element 61B are added to each other in the form of analog signals in an adder (adding amplifier) 74, and the result of such addition is supplied to dividers 76A and 76B. The divider 76A divides the analog output of the light receiving element 61A by the analog output of the adder 74A, and supplies the result of such division to a non-inverting input terminal of a subtracter (differential amplifier) 75. Meanwhile the divider 76B divides the analog output of the light receiving element 61B by the analog output of the adder 74, and supplies the result to an inverting input terminal of the subtracter 75.

The subtracter 75 subtracts the analog output of the divider 76B from the analog output of the divider 76A, and supplies the result of such subtraction to band pass filters 77 and 78. Each of these filters 77 and 78 extracts the analog component of a predetermined frequency band from the input signal, and then supplies the extracted component to the mark detector 36 or the frame address detector 37.

In this manner, the embodiment of FIG. 21 executes analog processing which is executed digitally in the foregoing embodiment of FIG. 20.

Figure 22:
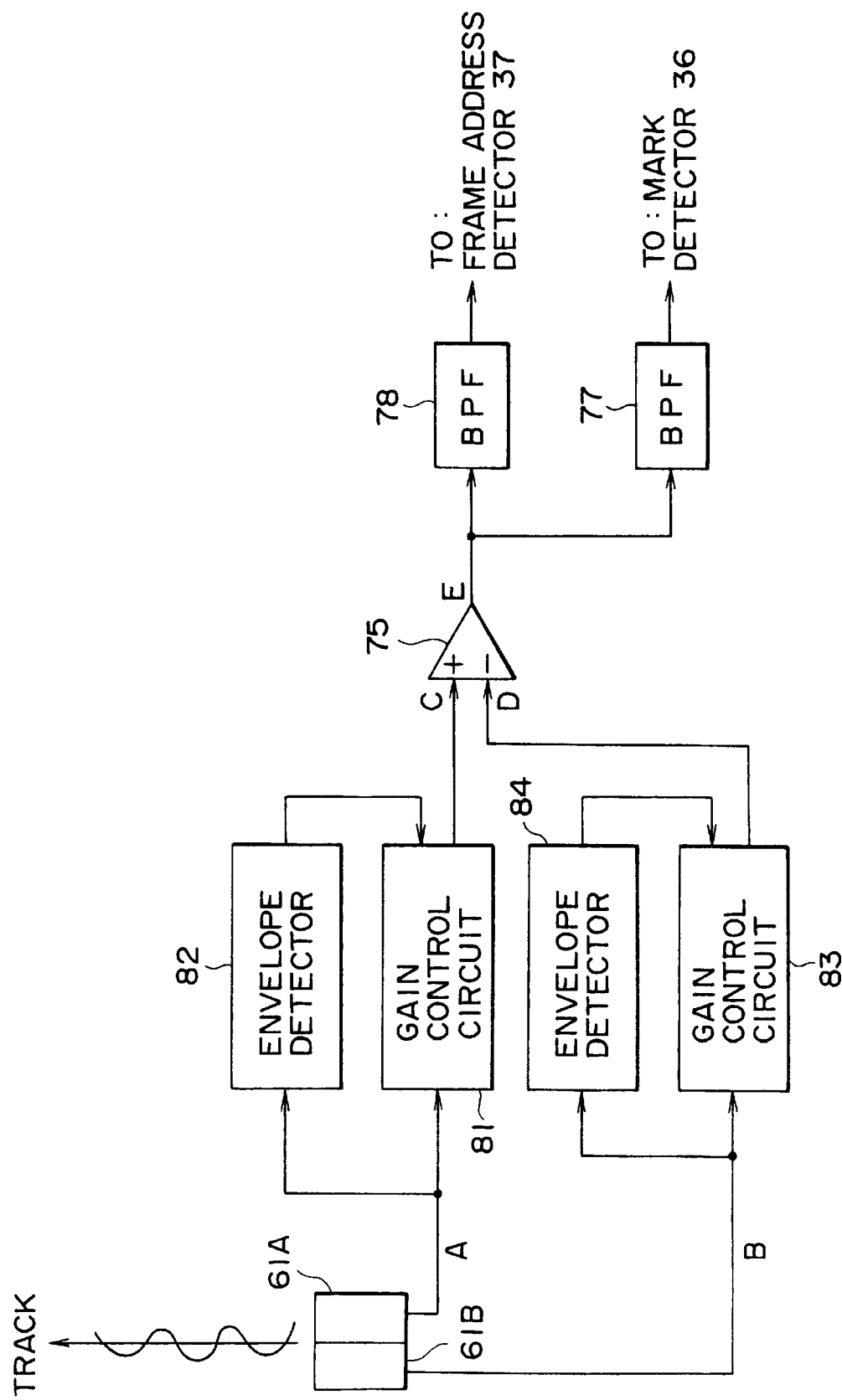
FIG. 22 is a block diagram showing an even further exemplary structure of the wobbled mark reproducing circuit 48.

FIG. 22 shows an even further embodiment of the wobble/mark reproducing circuit 48. In this embodiment, the output of a light receiving element 61A is supplied to a gain control circuit 81 and an envelope detector 82. The envelope detector 82 detects the envelope of the input signal and outputs the same to the gain control circuit 81. Similarly, the output of a light receiving element 61B is supplied to a gain control circuit 83 and an envelope detector 84. The envelope detector 84 detects the envelope of the input signal and outputs the same to the gain control circuit 83.

A subtracter 75 subtracts the output of the gain control circuit 83 from that of the gain control circuit 81, and then outputs the result to band pass filters 77 and 78.

Next, the operation of the above embodiment will be explained below with reference to timing charts of FIGS. 23A to 23E. The envelope detector 82 detects the envelope of the output (FIG. 23A) of the light receiving element 61A. The frequency of the envelope obtained from the envelope detector 82 is relatively low but slightly higher than the frequency prescribed by the rotation of the disk 1, as represented by a broken line in FIG. 23A. The envelope of the output signal from the light receiving element 61A is changed in accordance with a wobbling address signal and a fine clock mark signal as represented by a solid line in FIG. 23A, but the envelope of any higher frequency corresponding to such signals is not detected by the envelope detector 82.

Subsequently, the result of the detection outputted from the envelope detector 82 is supplied to the gain control circuit 81, where the level of the output signal from the light receiving element 61A is controlled in accordance with the detection signal from the envelope detector 82, so that a signal of FIG. 23C is obtained. In this signal, any level variation derived from nonuniform reflection of the disk 1 is suppressed, but the wobbling address signal component and the fine clock mark component are left.

Similarly to the above, the envelope detector 84 detects the envelope of the output (FIG. 23B) of the light receiving element 61B. The frequency of the envelope obtained from the envelope detector 84 is relatively low but slightly higher than the frequency prescribed by the rotation of the disk 1, as represented by a broken line in FIG. 23B. The envelope of the output signal from the light receiving element 61B is changed in accordance with a wobbling address signal and a fine clock mark signal as represented by a solid line in FIG. 23B, but the envelope of any higher frequency corresponding to such signals is not detected by the envelope detector 84.

Subsequently, the result of the detection outputted from the envelope detector 84 is supplied to the gain control circuit 83, where the level of the output signal from the light receiving element 61B is controlled in accordance with the detection signal from the envelope detector 84, so that a signal of FIG. 23D is obtained. In this signal, any level variation derived from nonuniform reflection of the disk 1 is suppressed, but the wobbling address signal component and the fine clock mark component are left.

Thus, in this embodiment, the output values of the light receiving elements 61A and 61B are detected by the envelope detectors 82 and 84 respectively, and then are normalized by the gain control circuits 81 and 83 respectively.

In this manner, when the output of the gain control circuit 83 is subtracted by the subtracter 75 from the output of the gain control circuit 81, there is obtained a signal of FIG. 23E where any variation caused by nonuniform reflection of the disk 1 is removed while the wobbling address signal component and the fine clock mark signal component are included. Consequently, such signal components can be extracted through the band pass filters 77 and 78 respectively.

It is to be noted that the present invention is applicable also to some other case of recording data on and/or reproducing the same from any disk other than an optical disk.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. An information recording/reproducing apparatus for recording information on and/or reproducing the same from a recording medium where a data recording track is previously formed as a pregroove, said apparatus comprising:

first and second detector means for detecting two diametrical side portions of the track on said recording medium where said pregroove is modulated in accordance with address information and sync information of mutually different frequency bands;

a calculator means for calculating a normalized track information signal on the basis of the outputs of said first and second detector means; and a third detector means for detecting said address information and/or said sync signal on the basis of the output of said calculator means, wherein said calculator means includes a first calculator means for executing a subtraction to obtain the difference between the output of said first detector means and the output of said second detector means; a second calculator means for adding the outputs of said first and second detector means to each other; and a third calculator means for dividing the output of said first calculator means by the output of said second calculator means.

2. An information recording/reproducing apparatus for recording information on and/or reproducing the same from a recording medium where a data recording track is previously formed as a pregroove, said apparatus comprising:

first and second detector means for detecting two diametrical side portions of the track on said recording medium where said pregroove is modulated in accordance with address information and sync information of mutually different frequency bands;

a calculator means for calculating a normalized track information signal on the basis of the outputs of said first and second detector means; and a third detector means for detecting said address information and/or said sync signal on the basis of the output of said calculator means, wherein said calculator means includes an adder means for adding the outputs of said first and second detector means to each other; a first divider means for dividing the output of said first detector means by the output of said adder means; a second divider means for dividing the output of said second detector means by the output of said adder means; and a subtracter means for executing a subtraction to obtain the difference between the outputs of said first and second divider means.

3. An information recording/reproducing apparatus for recording information on and/or reproducing the same from a recording medium where a data recording track is previously formed as a pregroove, said apparatus comprising:

first and second detector means for detecting two diametrical side portions of the track on said recording medium where said pregroove is modulated in accordance with address information and sync information of mutually different frequency bands;

a calculator means for calculating a normalized track information signal on the basis of the outputs of said first and second detector means; and a third detector means for detecting said address information and/or said sync signal on the basis of the output of said calculator means, wherein said calculator means includes a first envelope detector means for detecting the envelope of the output of said first detector means; a first gain control means for controlling the gain of the output of said first detector means on the basis of the output of said first envelope detector means; a second envelope detector means for detecting the envelope of the output of said second detector means; a second gain control means for controlling the gain of the output of said second detector means on the basis of the output of said second envelope detector means; and a subtracter means for calculating the difference between the output of said first gain control means and that of said second gain control means.

4. An information recording/reproducing method for recording information on and/or reproducing the same from a recording medium where a data recording track is previously formed as a pregroove, said method comprising the steps of:

detecting two diametrical side portions of the track on said recording medium where said pregroove is modulated in accordance with address information and sync information of mutually different frequency bands;

calculating a normalized track information signal on the basis of the detection of the two diametrical side portions; and detecting said address information and/or said sync signal on the basis of the step of calculating, wherein said step of calculating executes a subtraction to obtain the difference between the detection of each diametrical side portion, adds together the detection of each diametrical side portion to obtain a sum, and divides the difference by the sum.

5. An information recording/reproducing method for recording information on and/or reproducing the same from a recording medium where a data recording track is previously formed as a pregroove, said method comprising the steps of:

detecting two diametrical side portions of the track on said recording medium where said pregroove is modulated in accordance with address information and sync information of mutually different frequency bands;

calculating a normalized track information signal on the basis of the detection of the two diametrical side portions; and detecting said address information and/or said sync signal on the basis of the step of calculating, wherein said step of calculating adds the detection of each diametrical side portion to each other to obtain a sum, divides the detection of one diametrical side portion by the sum to obtain a first divided detection, divides the detection of the other diametrical side portion by the sum to obtain a second divided detection, and subtracts to obtain a difference between the first divided detection and the second divided detection.

6. An information recording/reproducing method for recording information on and/or reproducing the same from a recording medium where a data recording track is previously formed as a pregroove, said method comprising the steps of:

detecting two diametrical side portions of the track on said recording medium where said pregroove is modulated in accordance with address information and sync information of mutually different frequency bands;

calculating a normalized track information signal on the basis of the detection of the two diametrical side portions; and detecting said address information and/or said sync signal on the basis of the step of calculating, wherein said step of calculating detects an envelope of the detection of one diametrical side portion, controls the gain of the detection of the one diametrical side portion on the basis of the detection of the envelope, detects an envelope of the other diametrical side portion, controls the gain of the detection of the other diametrical side portion, and calculates a difference between the gain controlled detections.

7. An information recording/reproducing apparatus for recording information on and/or reproducing the same from a recording medium where a data recording track is previously formed as a pregroove, said apparatus comprising:

first and second detector means for detecting two diametrical side portions of the track on said recording medium where said pregroove is modulated in accordance with address information and sync information of mutually different frequency bands, the sync information inserted at a zero crossing point of a carrier which is frequency modulated by the address information;

a calculator means for calculating a normalized track information signal on the basis of the outputs of said first and second detector means; and a third detector means for detecting said address information and/or said sync signal on the basis of the output of said calculator means, wherein said calculator means includes a first calculator means for executing a subtraction to obtain the difference between the output of said first detector means and the output of said second detector means; a second calculator means for adding the outputs of said first and second detector means to each other; and a third calculator means for dividing the output of said first calculator means by the output of said second calculator means.

8. An information recording/reproducing apparatus for recording information on and/or reproducing the same from a recording medium where a data recording track is previously formed as a pregroove, said apparatus comprising:

first and second detector means for detecting two diametrical side portions of the track on said recording medium where said pregroove is modulated in accordance with address information and sync information of mutually different frequency bands, the sync information inserted at a zero crossing point of a carrier which is frequency modulated by the address information;

a calculator means for calculating a normalized track information signal on the basis of the outputs of said first and second detector means; and a third detector means for detecting said address information and/or said sync signal on the basis of the output of said calculator means, wherein said calculator means includes an adder means for adding the outputs of said first and second detector means to each other; a first divider means for dividing the output of said first detector means by the output of said adder means; a second divider means for dividing the output of said second detector means by the output of said adder means; and a subtracter means for executing a subtraction to obtain the difference between the outputs of said first and second divider means.

9. An information recording/reproducing apparatus for recording information on and/or reproducing the same from a recording medium where a data recording track is previously formed as a pregroove, said apparatus comprising:

first and second detector means for detecting two diametrical side portions of the track on said recording medium where said pregroove is modulated in accordance with address information and sync information of mutually different frequency bands, the sync information inserted at a zero crossing point of a carrier which is frequency modulated by the address information;

a calculator means for calculating a normalized track information signal on the basis of the outputs of said first and second detector means; and a third detector means for detecting said address information and/or said sync signal on the basis of the output of said calculator means, wherein said calculator means includes a first envelope detector means for detecting the envelope of the output of said first detector means; a first gain control means for controlling the gain of the output of said first detector means on the basis of the output of said first envelope detector means; a second envelope detector means for detecting the envelope of the output of said second detector means; a second gain control means for controlling the gain of the output of said second detector means on the basis of the output of said second envelope detector means; and a subtracter means for calculating the difference between the output of said first gain control means and that of said second gain control means.

10. An information recording/reproducing method for recording information on and/or reproducing the same from a recording medium where a data recording track is previously formed as a pregroove, said method comprising the steps of:

detecting two diametrical side portions of the track on said recording medium where said pregroove is modulated in accordance with address information and sync information of mutually different frequency bands, the sync information inserted at a zero crossing point of a carrier which is frequency modulated by the address information;

calculating a normalized track information signal on the basis of the detection outputs; and detecting said address information and/or said sync signal on the basis of result of said calculation, wherein said step of calculating executes a subtraction to obtain the difference between the detection of each diametrical side portion, adds together the detection of each diametrical side portion to obtain a sum, and divides the difference by the sum.

11. An information recording/reproducing method for recording information on and/or reproducing the same from a recording medium where a data recording track is previously formed as a pregroove, said method comprising the steps of:

detecting two diametrical side portions of the track on said recording medium where said pregroove is modulated in accordance with address information and sync information of mutually different frequency bands, the sync information inserted at a zero crossing point of a carrier which is frequency modulated by the address information;

calculating a normalized track information signal on the basis of the detection outputs; and detecting said address information and/or said sync signal on the basis of result of said calculation, wherein said step of calculating adds the detection of each diametrical side portion to each other to obtain a sum, divides the detection of one diametrical side portion by the sum to obtain a first divided detection, divides the detection of the other diametrical side portion by the sum to obtain a second divided detection, and subtracts to obtain a difference between the first divided detection and the second divided detection.

12. An information recording/reproducing method for recording information on and/or reproducing the same from a recording medium where a data recording track is previously formed as a pregroove, said method comprising the steps of:

detecting two diametrical side portions of the track on said recording medium where said pregroove is modulated in accordance with address information and sync information of mutually different frequency bands, the sync information inserted at a zero crossing point of a carrier which is frequency modulated by the address information;

calculating a normalized track information signal on the basis of the detection outputs; and detecting said address information and/or said sync signal on the basis of result of said calculation, wherein said step of calculating detects an envelope of the detection of one diametrical side portion, controls the gain of the detection of the one diametrical side portion on the basis of the detection of the envelope, detects an envelope of the other diametrical side portion, controls the gain of the detection of the other diametrical side portion, and calculates a difference between the gain controlled detections.

* * * * *